Dec. 16, 1952  W. A. KINGSBURY  2,622,002
METHOD AND APPARATUS FOR PITTING PEACHES
Filed May 10, 1947  11 Sheets-Sheet 1
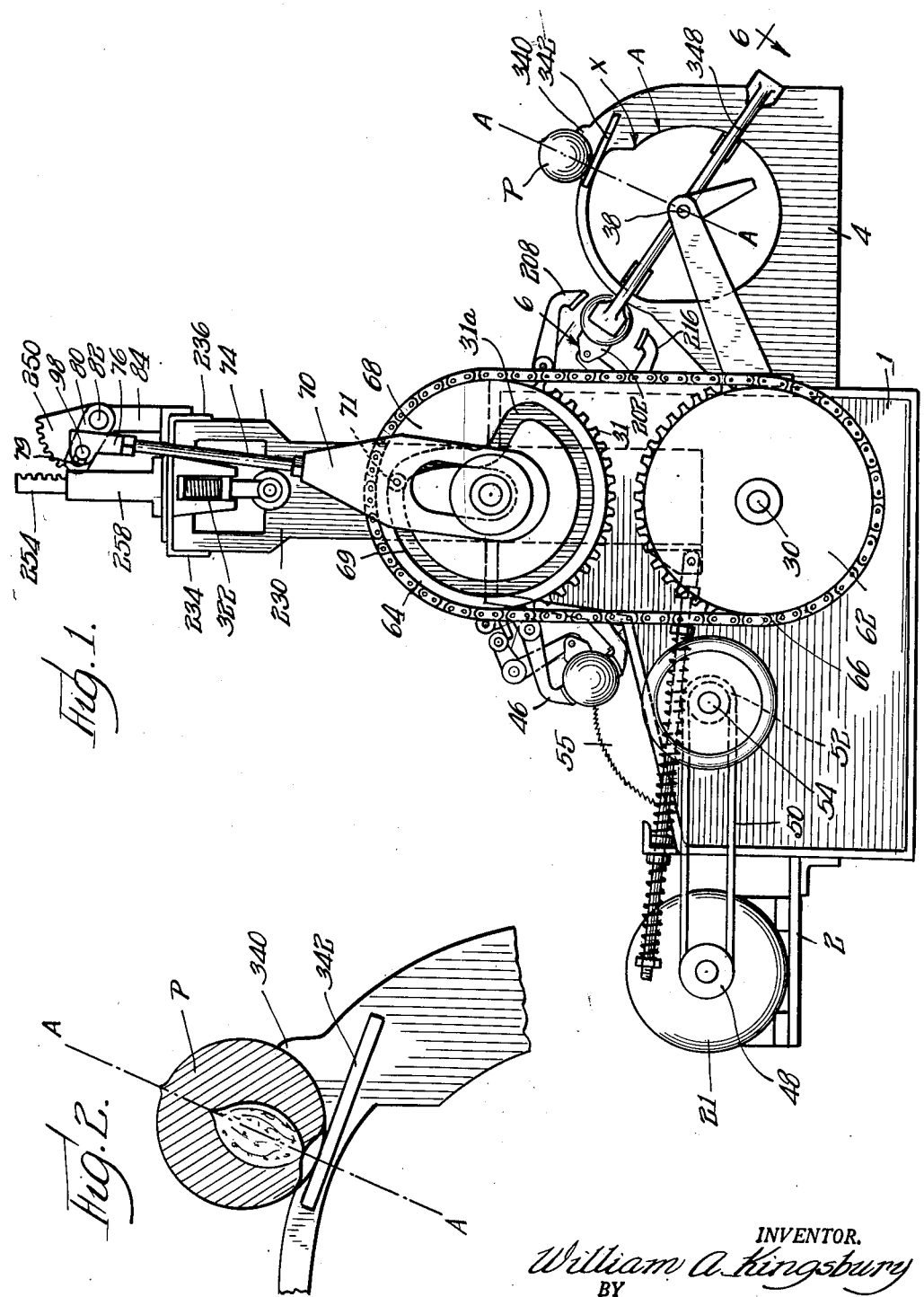
INVENTOR.
William A. Kingsbury
BY
Moore, Olson & Trexler
Attys.

Dec. 16, 1952 W. A. KINGSBURY 2,622,002
METHOD AND APPARATUS FOR PITTING PEACHES
Filed May 10, 1947 11 Sheets-Sheet 2
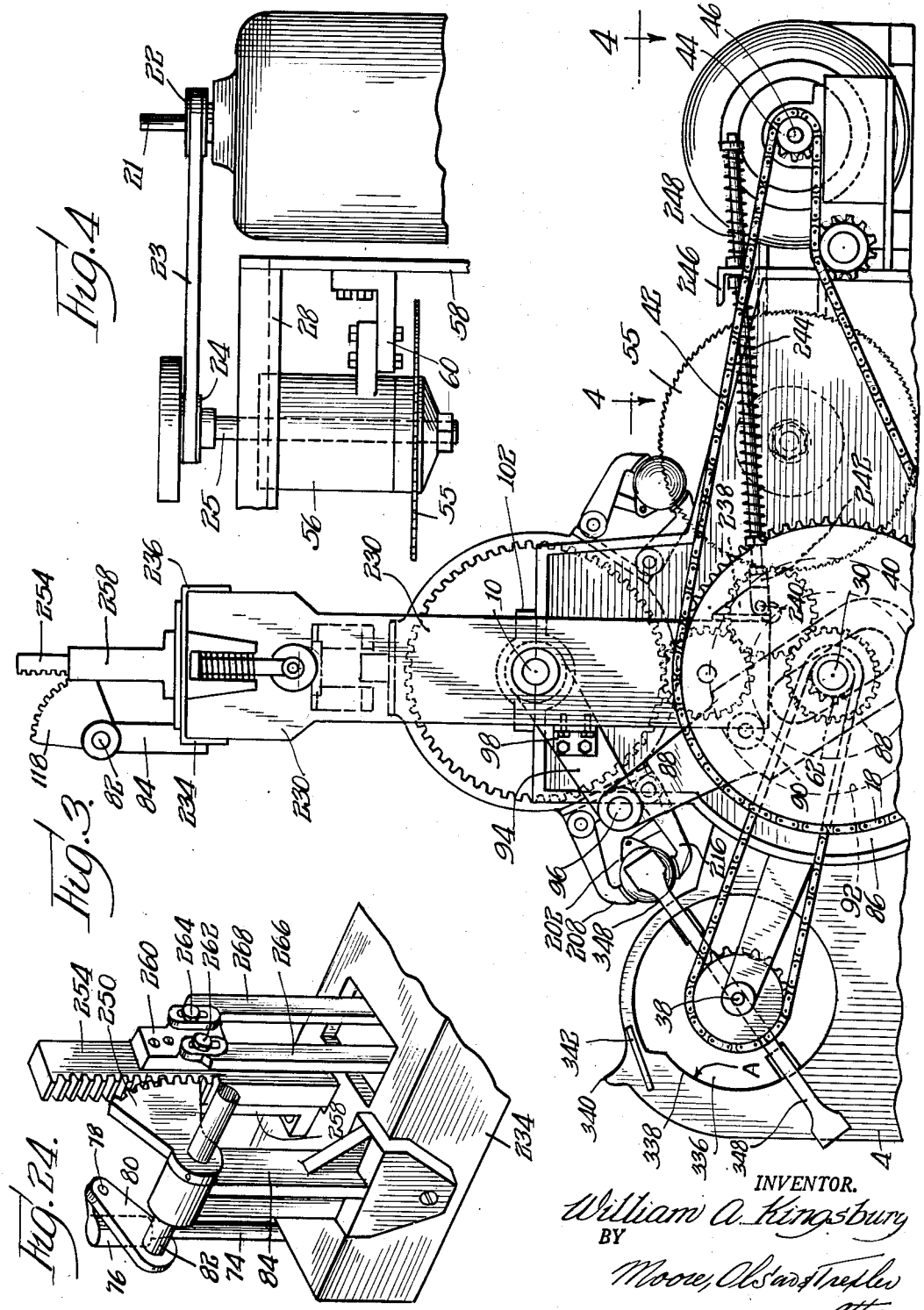
INVENTOR.
William A. Kingsbury
BY
Moore, Olsen & Trexler
attys.

Dec. 16, 1952 W. A. KINGSBURY 2,622,002
METHOD AND APPARATUS FOR PITTING PEACHES
Filed May 10, 1947 11 Sheets-Sheet 3

INVENTOR.
William A. Kingsbury
BY
Moore, Olson & Trexler
Attys.

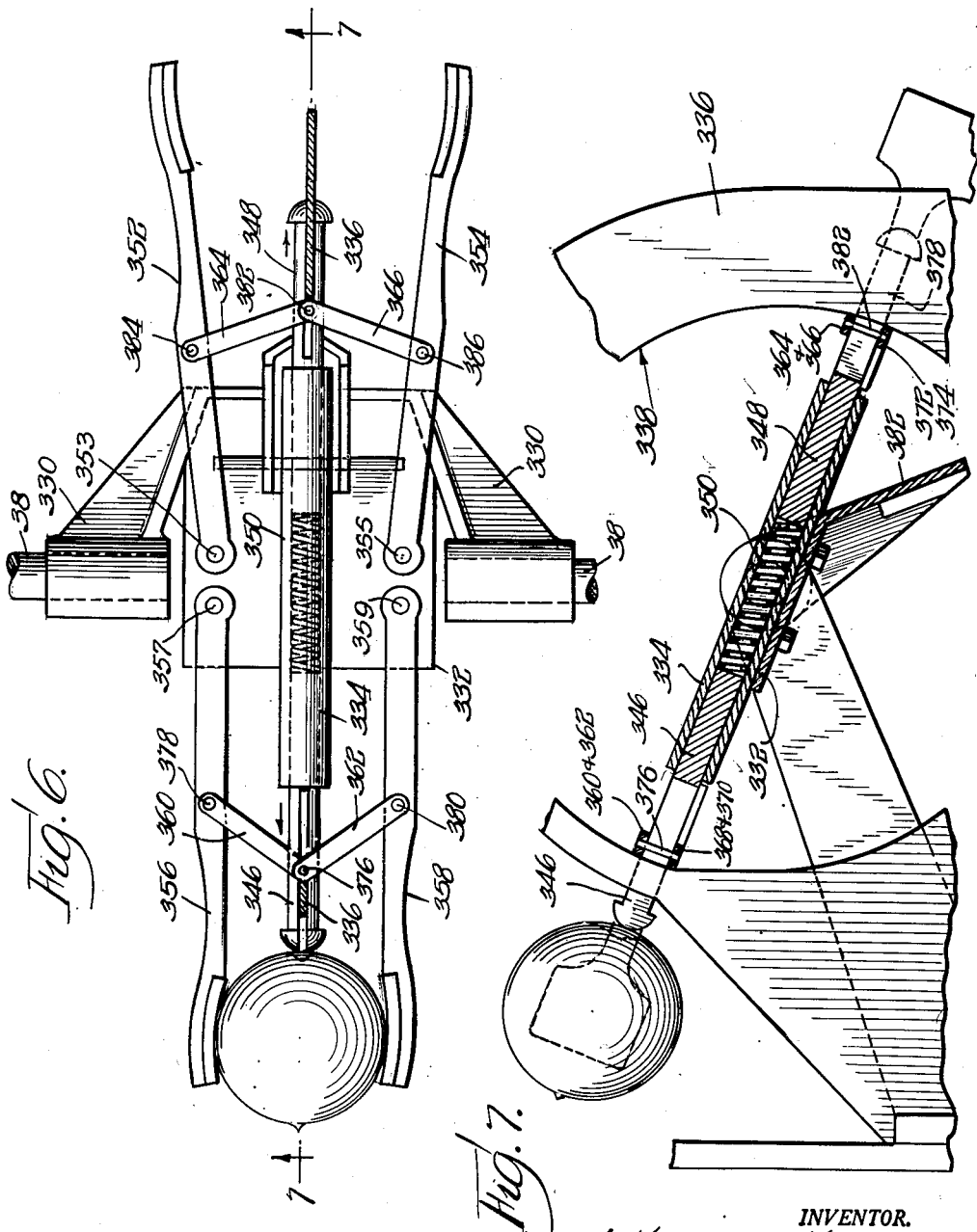

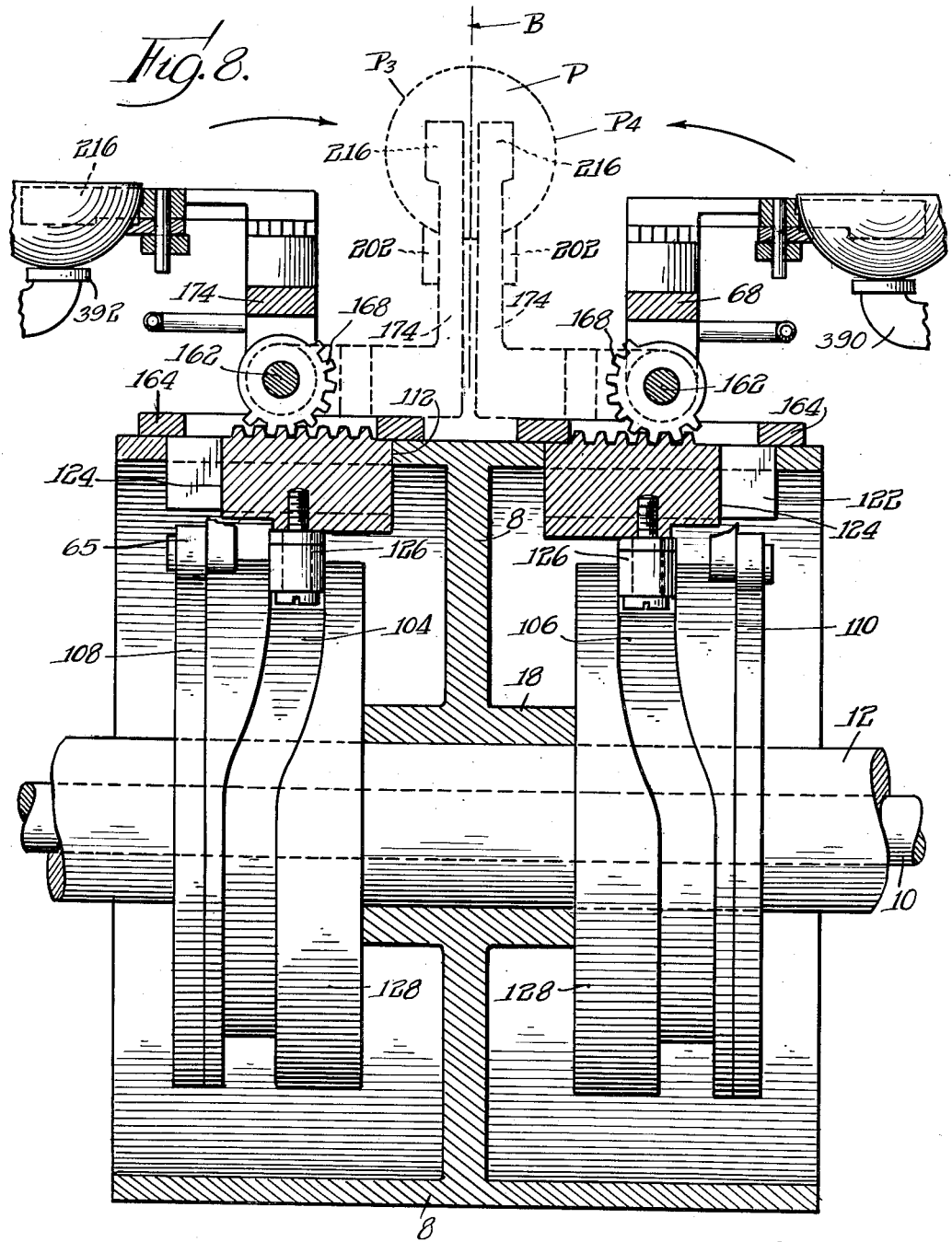

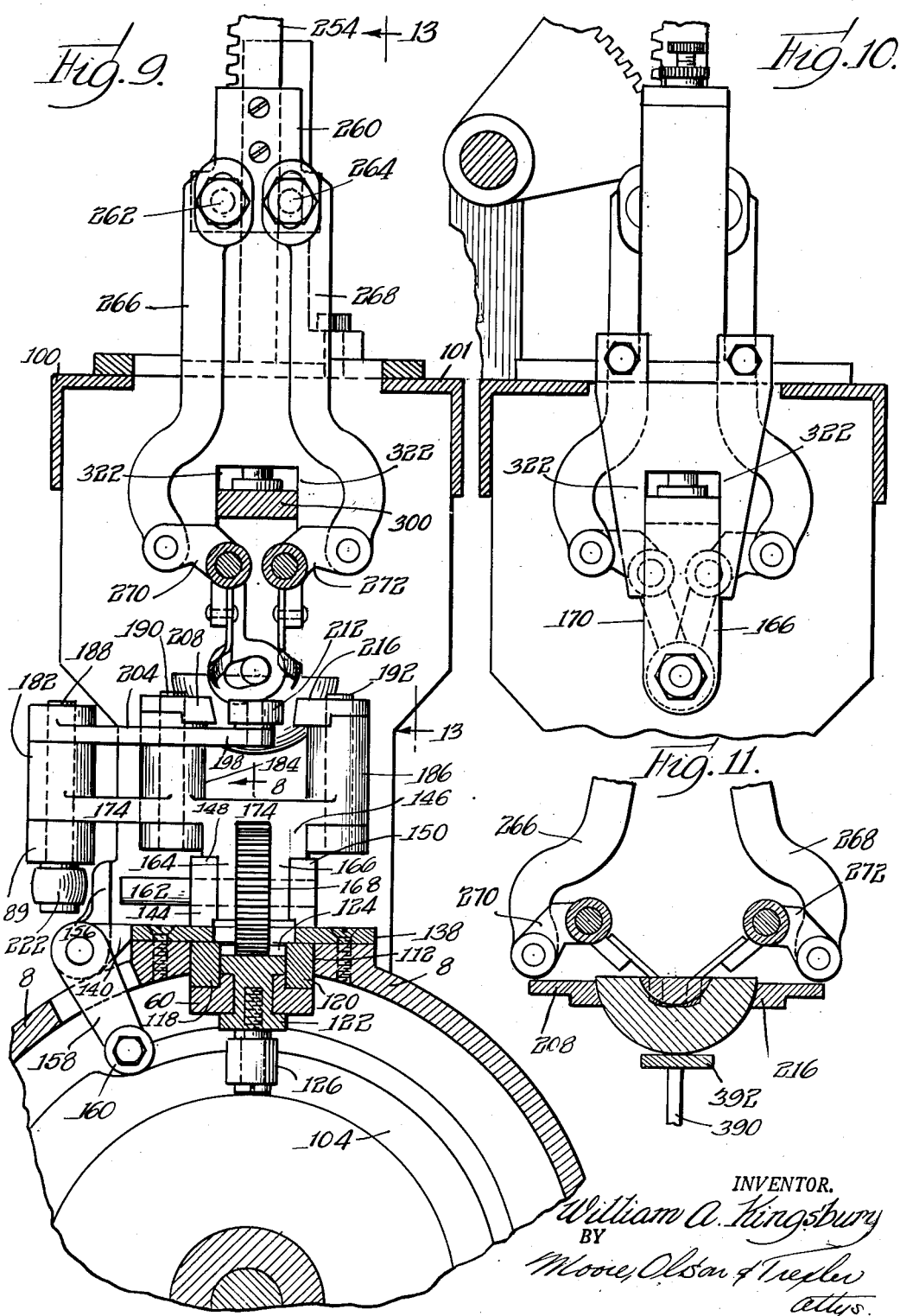

Dec. 16, 1952    W. A. KINGSBURY    2,622,002
METHOD AND APPARATUS FOR PITTING PEACHES
Filed May 10, 1947    11 Sheets-Sheet 7

INVENTOR.
William A. Kingsbury
BY
Moore, Olson & Trexler
Attys.

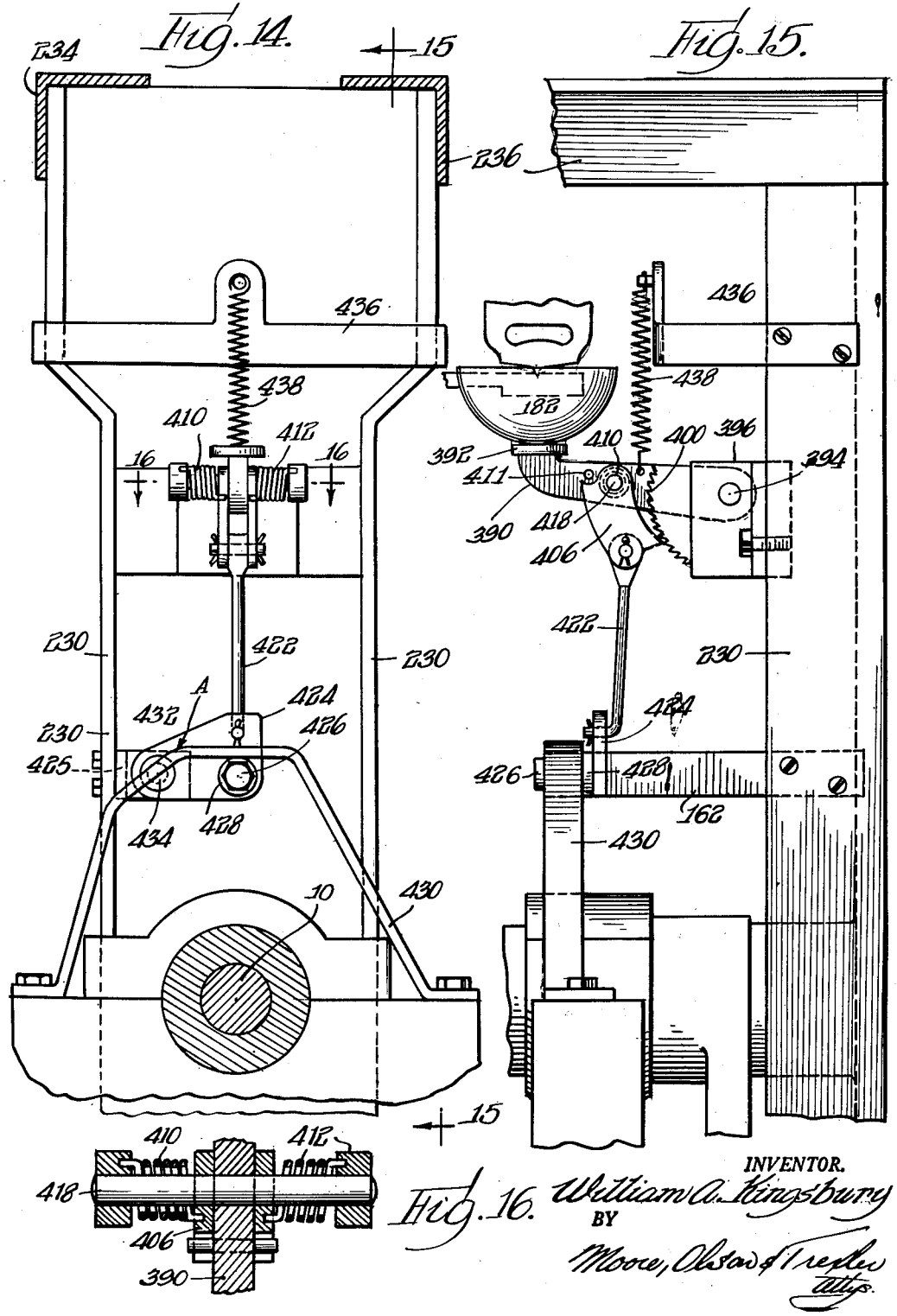

Dec. 16, 1952     W. A. KINGSBURY     2,622,002
METHOD AND APPARATUS FOR PITTING PEACHES
Filed May 10, 1947     11 Sheets-Sheet 9

INVENTOR.
William A. Kingsbury
BY
Moore, Olson & Trexler
attys.

Dec. 16, 1952 W. A. KINGSBURY 2,622,002
METHOD AND APPARATUS FOR PITTING PEACHES
Filed May 10, 1947 11 Sheets-Sheet 10
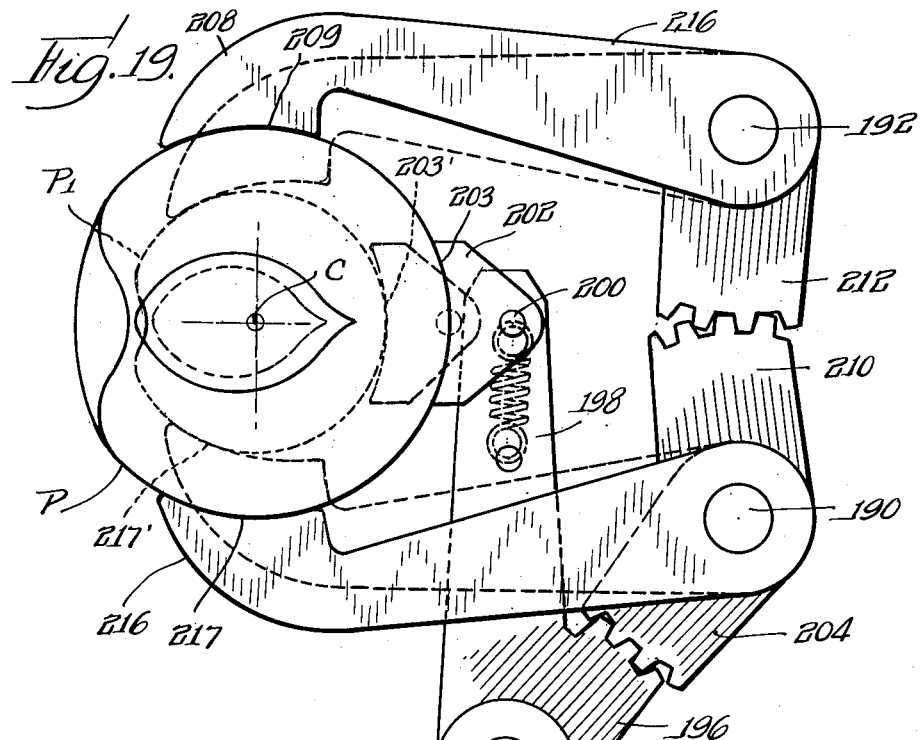
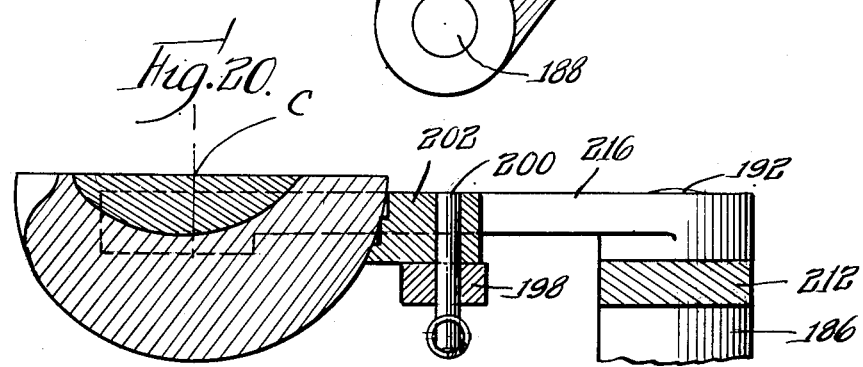
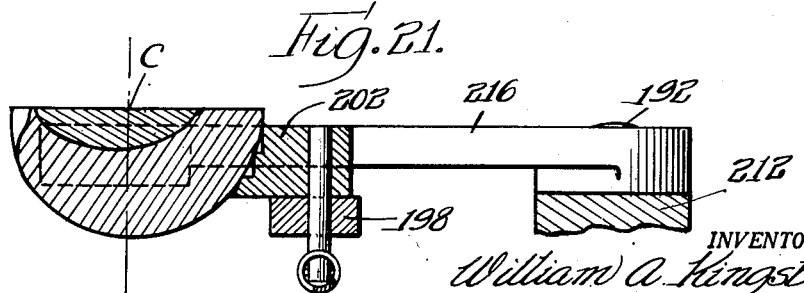
INVENTOR.
William A. Kingsbury
BY
Moow, Alston & Hepler
attys.

Dec. 16, 1952 W. A. KINGSBURY 2,622,002
METHOD AND APPARATUS FOR PITTING PEACHES
Filed May 10, 1947 11 Sheets-Sheet 11
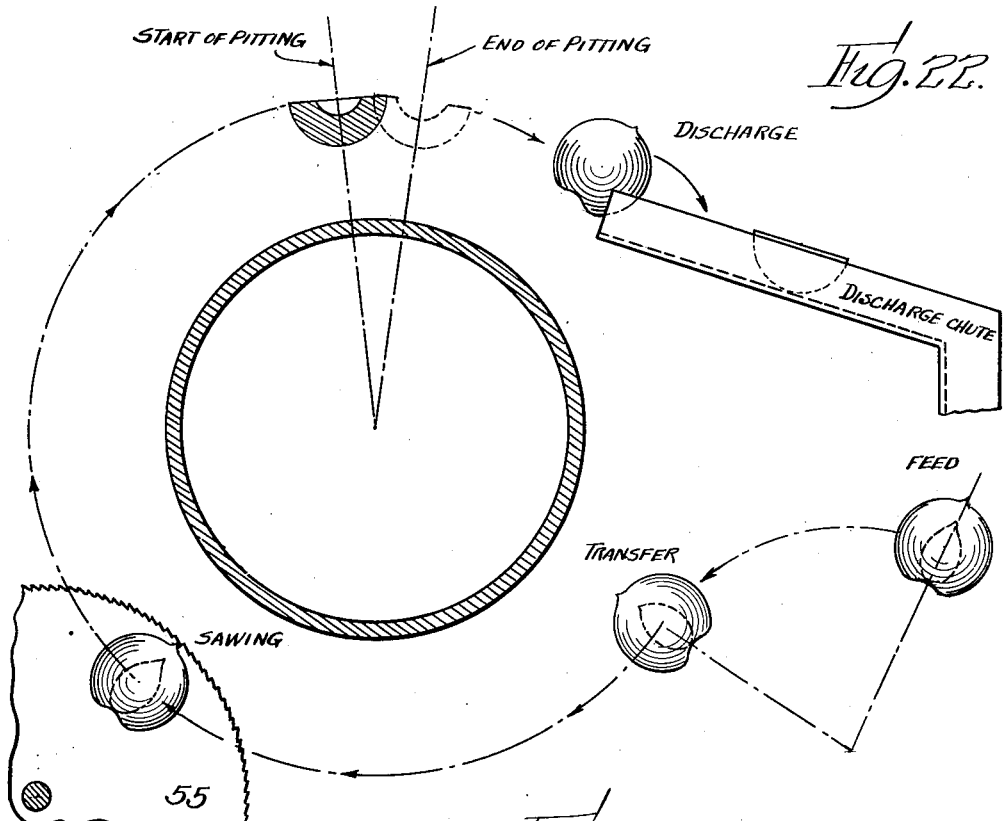
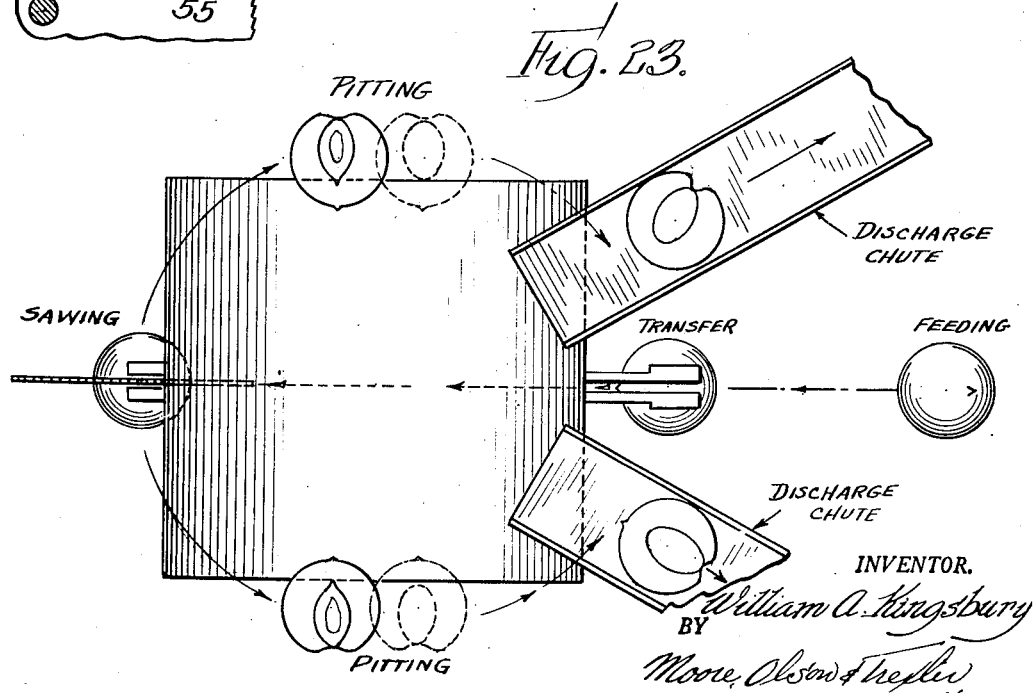
INVENTOR.
William A. Kingsbury
BY Moore, Olson & Trexler
attys.

Patented Dec. 16, 1952

2,622,002

UNITED STATES PATENT OFFICE 2,622,002

METHOD AND APPARATUS FOR PITTING PEACHES

William A. Kingsbury, Oakland, Calif., assignor to Special Equipment Company, Portland, Oreg., a corporation of Oregon Application May 10, 1947, Serial No. 747,185

34 Claims. (Cl. 146—238)

This invention relates to devices for feeding and pitting peaches, and more particularly does it relate to a device for automatically feeding a succession of peaches of variant sizes and automatically cutting the peaches and their pits into halves, and for thereafter automatically pitting the peach halves.

Among the objects of the present invention is to provide a device capable of continuously feeding a succession of peaches of variant sizes and for automatically cutting the whole peaches in halves without interrupting their feeding movement and for thereafter automatically pitting each half peach without interrupting its feeding movement, the feeding mechanism including fruit gripping members constructed and arranged properly to center the successive peaches so that each half peach will be properly centered with respect to the pitting mechanism irrespective of the size of the half peach.

Another object of the invention resides in providing a mechanism for continuously feeding, halving and pitting the cut halves without interrupting the feeding movement thereof wherein mechanism is utilized for effecting the pitting action which includes pit cutting means adapted arcuately to move through the flesh of the cut face of the half fruit to sever the half pit therefrom, and wherein the cut face of the half fruit is free of any mechanism for holding down the cut face of the half fruit.

Another object of the present invention resides in providing an automatic machine for continuously feeding a succession of variant sized peaches through the machine for automatically halving the peaches without interrupting their travel and for thereafter automatically pitting each half peach without interrupting its travel, wherein means is provided for gripping the whole peach and for centering each half section thereof for the pitting operation by a mechanism which contacts only the curved periphery of the half peach and not the cut face thereof, whereby each half peach is properly centered with respect to the feeding mechanism despite the variation in the size of the whole peaches so fed.

Yet another object of the present invention resides in providing a novel type of fruit gripping means adapted not only to grip a whole fruit for feeding and for halving the same while being uninterruptedly fed and for thereafter bodily shifting each half peach into spaced apart position with the cut faces lying in a common plane and for properly centering each half peach so held and presenting the cut face thereof to a pair of pitting mechanisms adapted simultaneously to pit the properly centered half peaches.

Yet another object of the present invention resides in providing, in an automatic machine, means for feeding a succession of whole peaches of variant sizes along a predetermined path and for halving each of the whole peaches so fed, portions of the whole peach holding mechanism being constructed and arranged to shift relatively and properly to center and hold each severed half peach in spaced relations with their cut faces lying in a substantially common plane, there being means to subject such cut faces to the action of the pitting means whereby to pit the same.

Yet another object of the invention resides in providing, in an automatic peach feeding, halving and pitting mechanism, sets of peach gripper jaws adapted to grip a whole peach therebetween and to automatically center the whole peach with respect to the cutting plane of the halving mechanism, and thereafter to cause portions of the peach gripping mechanisms to shift relatively into spaced planes, each carrying a half section of a peach, and to shift each half section with the cut face in common planes with the pit section properly centered so as to have the pit section pitted therefrom.

Yet another object of the invention resides in providing fruit gripping means for an automatic peach feeding, halving and pitting mechanism wherein the fruit gripping means comprises a plurality of gripping or holding fingers, relatively movable, and including automatic mechanism to cause said fingers to shift relatively toward and away from each other with respect to a predetermined center in such manner that a peach, whether large or small, is properly centered.

Yet another object of the invention resides in providing a machine for continuously pitting whole peaches of successively variant sizes wherein the whole peaches are adapted to be fed along a predetermined path of travel without interruption, and wherein the peaches are halved and then fed by means of an oscillatory or swinging pitter adapted to move in one position along a path of travel adjacent to the cut face of the continuously moving half peach, and whereby the half peach and pitter mechanism travel at a uniform speed whereby to pit the peach.

Another object of the invention resides in providing a machine of the class described wherein a novel type of fruit gripping means is provided comprising a plurality of relatively shiftable grippers adapted to contact the curved periphery of the peach to center the same for pitting, and whereby an additional backing-up member is adjustably shiftable relatively to that part of the curved surface of the peach directly opposite the cut face of the half peach, so as to form a backing-up member or substantially rigid reinforcing means to hold the peach firmly during the pitting action and yet which backing-up member is shiftable to an out of the way position to permit the peach to move during the nonpitting travel of the peach.

Yet another object of the invention resides in providing an automatic pitting machine of the foregoing character which includes a continuously rotating drum or carrier having thereon a plurality of fruit gripping means comprising relatively shiftable gripping members, together with mechanism operable automatically to shift said gripping members during the continuous rotation of the turret whereby the gripping members will automatically grip and hold therebetween a whole peach, in such a way as to present the suture plane of the held whole peach to a rotating saw or the like for halving the peach, whereby during the continuous rotation of the turret the gripping members holding the two halves of the severed peach will then be shifted relatively to each other whereby each half thus held will be shifted substantially ninety degrees, so that the two held halves each being thereafter held by only a portion of the gripping members that hold the whole peach, to a position such that the cut faces of the two held halves are in a common plane at right angles to their former plane of severance and whereby, travelling in such position, the two halves will then be pitted without interrupting the travel of the turret.

Yet another object of the invention resides in the means whereby a succession of whole peaches of variant sizes may be placed on a stationary cradle or other feeding station and will then be automatically gripped and removed therefrom while maintaining the suture plane in predetermined position, and thereafter transferred automatically and gripped by gripping devices carried by a continuously rotating turret which thereafter acts to feed the whole peaches with the suture plane in predetermined parallel position with respect to the plane of rotation of a halving saw, and wherein subsequently the severed halves are presented to pitting mechanism without interrupting the continuous and automatic feed of the fruit through the machine.

Another object of the present invention resides in providing an improved method of gripping whole peaches with their suture planes in predetermined position and sawing them while thus gripped along a plane parallel with the suture plane, and for thereafter turning each half peach without disturbing its gripped position, and for adjustably holding the curved face of each half peach at a location opposite its cut face whereby the peach is held in properly centered position, and from there, pitting each so held half peach.

These and other objects of the invention will be apparent from a perusal of the following specification when taken in connection with the accompanying drawings, wherein:

Figure 1 represents a side view of one form of my improved machine;

Figure 2 is an enlarged detail view showing the manner in which the whole peach is positioned on the stationary feeding support;

Figure 3 is an enlarged end view of the machine;

Figure 4 is a plan view showing the motor drive to the saw;

Figures 6 and 7 are plan and side views, respectively, of the mechanism that feeds the whole peaches to the continuously rotating turret of the machine;

Figure 8 is a sectional view of the continuously rotating drum that carries the peach gripping members;

Figure 9 is an end view of the pitting mechanism taken on the line 9—9 of Figure 5;

Figure 10 is a somewhat similar view showing the manner in which the pitter head slides in vertical guideways.

Figure 11 is a partial view showing the half peach being pitted and the manner in which the half peach is supported during the pitting operation.

Figure 14 is a section taken on the line 14—14 of Figure 5;

Figure 15 is a side view of the structure shown in Figure 14;

Figure 16 is a section taken on the line 16—16 of Figure 14;

In Figure 18 the gripping mechanism is shown as detached from its operating base in the interest of clearness;

Figure 19 is a plan view of the gripping mechanism showing the manner in which the same is self-centering to hold peaches of variant sizes;

Figure 20 is a top view of the mechanism shown in Figure 19, the same holding a large peach;

Figure 21 is a view similar to Figure 20, but showing the mechanism holding a relatively small peach;

Figure 22 is a diagrammatic view showing the manner in which a whole peach is fed in a continuous manner to the turret for sawing and for pitting and for discharging;

Figure 23 is a plan view of the diagrammatic layout of Figure 22; and

Figure 24 is an enlarged detail view showing the connection between the driving mechanism and each separate pitting mechanism.

In general the invention comprises a method of and apparatus for pitting peaches in a continuous manner. An automatic machine is herein disclosed and claimed, which illustrates one device for carrying out the method involved. The claims are for both the method and apparatus for feeding, halving and pitting a succession of peaches of variant sizes in a continuous manner. In general the apparatus comprises means for supporting a whole peach with its suture plane in predetermined position and with its longitudinal seed axis likewise in predetermined position. The invention also includes means for automatically grasping the whole peaches thus positioned and for feeding them automatically and continuously to a continuously travelling carrier having a plurality of spaced fruit grippers, which fruit grippers automatically proceed to grasp the whole fruit at predetermined locations removed from the suture plane, and wherein the suture plane is positioned in a predetermined manner with the whole peaches thus held so that the succession of peaches, be they small or large, are carried automatically and continuously through a halving mechanism which proceeds to halve the flesh and pit portions of the whole peach while maintaining them in predetermined relationship. The fruit gripping mechanism also includes devices for shifting portions of the gripping mechanism relatively whereby the combined gripping mechanism that held the peach for the halving operation will then subdivide so that the separate subdivisions of the gripping mechanism will each be shifted substantially ninety degrees whereby each subdivision of the gripping mechanism will separately and independently hold a half peach without disturbing the gripped relationship, and wherein the two peach halves will then be shifted into a position such that their cut faces lie in a common plane and spaced apart and properly centered with respect to pitting mechanism. The machine also includes an adjustable mechanism for backing up the curved surface of each half peach which lies opposite the cut face so that as the continuously moving peach passes adjacent a pitting mechanism each half peach will be pitted by a pitting mechanism travelling at the same speed as the half peach, and in such a manner that the gripping mechanism will properly center each half peach with respect to the zone of pitting action of the pitting mechanism irrespective of the size of the half peach being gripped. The mechanism also includes further devices for automatically thereafter discharging each pitted half peach, all in a continuous manner.

Figure 5:
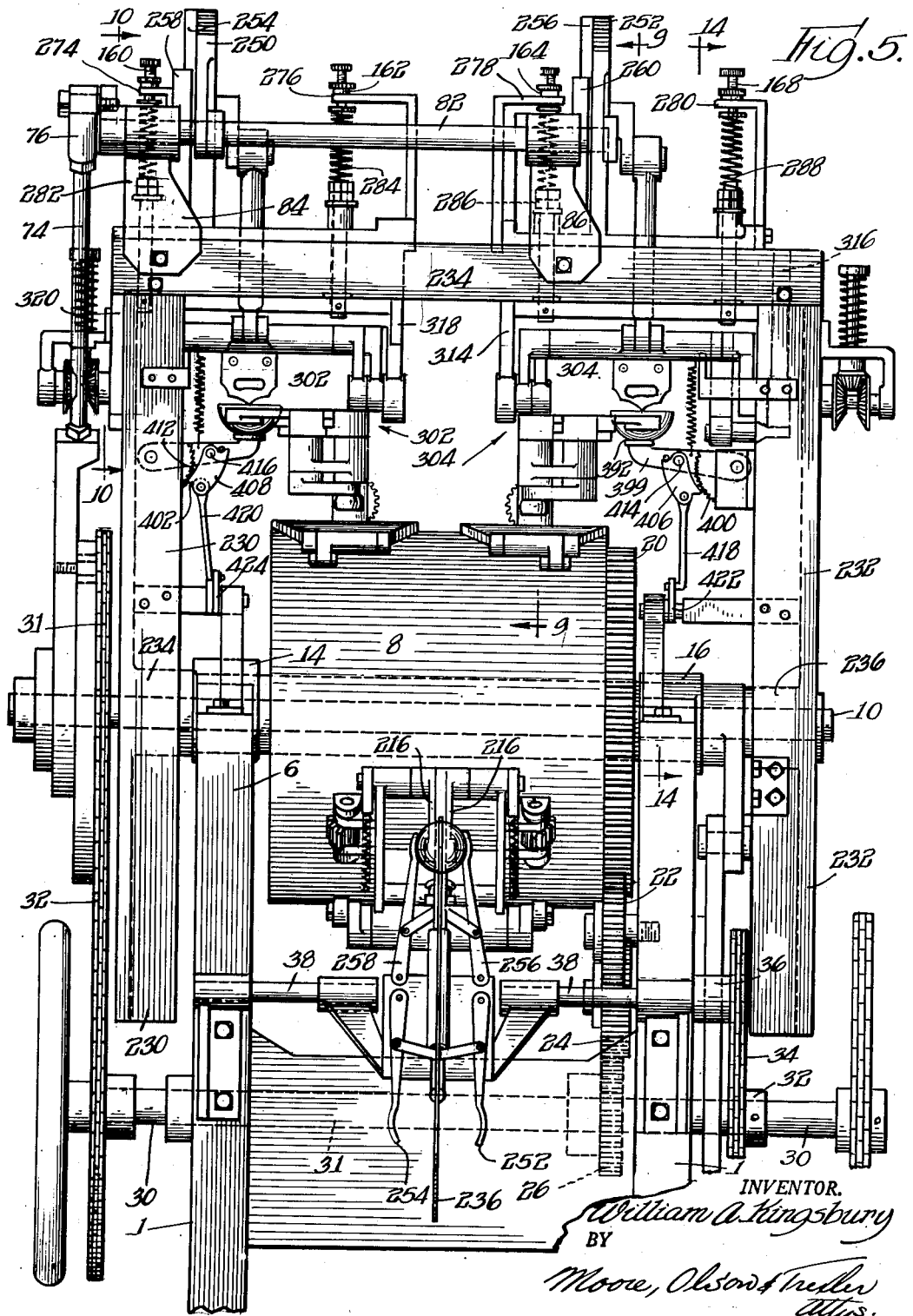
Figure 5 is a front view taken from the infeed end of the machine.

Referring now to the drawings in detail, the machine comprises a main central frame 1, preferably of general box-like skeletonized structure having projecting from its left side a shelf-like bracket 2 and on its opposite side there is provided a laterally extending frame 4, see Figure 1. At the top the box-like structure is provided with an upward projection on one side, such as 6, see Figure 3. The upper part of this frame-like projection 6 at its top is provided with suitable bearings in which a main drum 8, see Figure 5, is rotatably supported on the elongated shaft 10, see Figure 8. Surrounding shaft 10 is a tubular shaft 12 fixed in the bearings 14 and 16, see Figure 5. The hub 18 of this drum 8 is rotatably mounted, as before stated, on the tubular shaft 12. A gear 20 is fastened to one side of the drum 8, see Figure 5. This gear 20 is driven by a train of gears 22, 24 and 26. Gear 26 is fastened to a drive shaft 30. Mounted upon this shaft 30 is a sprocket 32 which through a chain 34 drives sprocket 36 fastened to the feed drive shaft 38. As seen in Figure 3, there is shown as fastened to the drive shaft 30 a large sprocket 40 about which a chain 42 passes to a smaller sprocket 44 on the motor drive shaft 46. This motor drive shaft 46 is driven by the motor. As shown in Figure 1, on the opposite end of the motor drive shaft 46 is a pulley 48 which by means of belt 50 drives a pulley 52 which in turn rotates the saw shaft 54. By reference to Figure 4, the saw arbor housing 56 is fastened to the frame 58 by a bracket 60. The saw arbor and its housing are of the general construction shown in prior Ewald patents, such as Ewald Patent 2,398,780.

By reference to Figure 1, a sprocket 62 is fastened to the drive shaft 30 and drives a sprocket 64 by means of a chain belt 66. This upper sprocket 64 includes a cam 68 having a race 69 and a slotted cam yoke 70 carries a roller 71 projecting laterally from its side to ride in the cam groove 69 whereby to reciprocate yoke 70. This cam yoke 70 has an extension 74 carrying a head 76 which has a lateral projection thereon that carries a laterally extending bolt 78, see Figure 24. The head 76 is connected to a slotted lever 80 by the bolt 78. Provision is made for adjustment of this connection by means of a slot 79, see Figure 1, in the lever 80. The lever 80 is pivoted on the shaft 82 which is supported by a bracket 84.

Also keyed to the motor driven drive shaft 30 is a cam 86. A second yoke 88 carries a roller 90 which rides in a cam track 92 on cam 86. The yoke 88 is connected to a lever 94 by a pivotal connection 96. The lever 94 floats or rotates loosely on the shaft 10. An angle plate 98 is bolted both to the lever 94 and to a vertical oscillatable arm 230 hereinafter referred to as having a bearing 102 on shaft 10. Lever 94 oscillates the vertical arm 230 which carries the pitting mechanism.

As before stated, the drum 8 is rotatably mounted on the shaft 10. This drum has three sets of peach gripper means in the form of spaced jaws equally spaced about its periphery. Each set of gripper jaws or means is composed of relatively shiftable members. These gripper jaws are disposed in relatively shiftable sets disposed in spaced relation and gripping the curved wall of the whole peach in spaced relation from and on opposite sides of the suture plane of the whole peach. Each set comprises three equally spaced and equally movable jaws. The jaws are constructed and arranged first to receive therebetween a whole peach from the feed cup and to pass the whole fruit thus held through the splitting saw. After severing the peach into halves, each set of gripper jaws then automatically swings outwardly as it moves arcuately with and on the drum carrier 8, whereby to position the cut face of each gripped half peach parallel to the axis of rotation of the drum carrier or conveyor shaft 4. Thus the cut face of each half peach is presented to a pair of overlying pitting means mounted on oscillatable arm 230 and which arm at such instant is moving with the peach halves.

The means for automatically shifting the peach gripper jaws is seen by reference to Figure 8. Positioned inside of the constantly rotating support or drum 8 are located four stationary cams which are mounted on the tubular shaft 12. These cams comprise the similar cam tracks 104 and 106 and the cams 108 and 110. As shown in Figures 8 and 9, the inner wall of the drum 8 is provided with three spaced apart similar openings 112, see Figure 18, in which are located pairs of two spaced apart guide bars 118 and 120 forming guideways for pairs of spaced slides 122. A toothed rack 124 is mounted in each slide 122. Each rack slide 124 carries a roller 126 which depends from the under face of the rack. The roller 126 rides in the groove 104 of a first cam 128 while the other similar roller 126 on the other rack 124 rides in the cam groove 106 of the identical cam 128, see Figure 8. Forming an outer facing for the openings 112 on the exterior wall of the drum 8 are a series of plates 138, see Figures 9 and 18. Each such plate 138 is provided on its outer face with a pair of laterally outstanding ears 140 and 142, see Figure 18, and at its top is provided with a pair of spaced upstanding ears 144 and 146 which are suitably perforated as at 148 and 150. The perforations of the ears 140 and 142 receive a pivot pin 152 on which is mounted a sleeve 154 having an offset lug 156 and an offset lever 158 carrying a roller 160, see Figure 18.

Figures 17, 18:
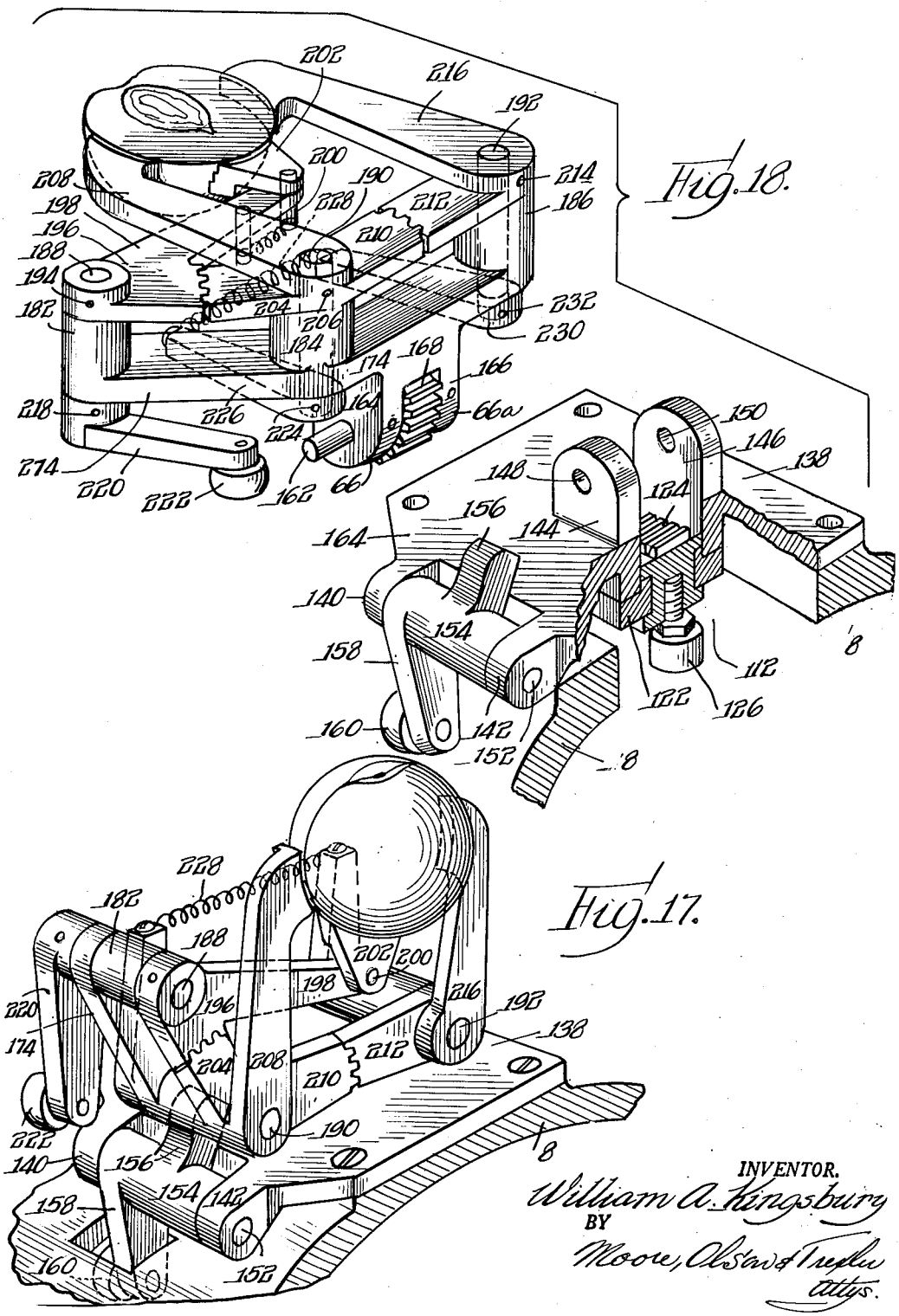
Figure 17 is a view of the gripping mechanism on the continuously rotating turret, showing the same holding a whole peach, only one half of the gripping mechanism being shown.
Figure 18 is a view showing one half of the gripping mechanism shifted ninety degrees to hold a severed half peach.

As shown in these Figures 9 and 18, the two upstanding ears 144 and 146 on the rigid plate 138 carried by the rotating drum 8 support a pivot pin 162, see Fig. 9, which loosely passes through spaced perforations in a pair of downwardly depending lugs 164 and 166 on a pivotally mounted carrier plate 174 that carries the peach holders. A toothed segment 168 is rigidly fastened in position between the lugs 164 and 166 depending from the carrier or conveyor plate 174 on which the peach gripping jaws are mounted, and its teeth project beyond the periphery of these lugs to engage the underlying rack 124 so that when the rack 124 is shifted by its appropriate cam the peach gripping jaws on the plate 174 will be shifted from vertical position as in Figure 17 to horizontal position as in Figure 18. The ends of the pin 162 are mounted in the registering apertures of the depending lugs 164 and 166 on the plate 174. Upon movement of the rack 124 the segment 168 is bodily oscillated. This segment, in thus bodily oscillation, will oscillate its plate-like carrier or support 174. This plate 174 has three upstanding bearings 182, 184 and 186 which support pins 188, 190 and 192. The pin 188 has pinned thereto as at 194 a toothed segment 196, see Figures 17 and 18. This segment has integrally formed therewith an arm 198 supporting at its outer end a pin 200. On this pin 200 is pivotally mounted a sector-like peach gripping member or support 202. The toothed portion of the segment 196 meshes with another segment 204 pinned as at 206 to the pin 190. This segment 204 in turn has an integrally extending overlying elongated clamping peach or fruit or gripping member or jaw 208 formed therewith. In addition, the toothed segment 204 has an oppositely extending integral toothed sector 210 meshing with another sector 212 which is pinned as at 214 to the upstanding pin 192. This sector 212 has in turn formed integrally therewith an elongated peach clamping or gripping member 216. The outer ends of the peach clamping members 208 and 216 are formed with arcuate surfaces to fit about the peripheral wall of a whole peach or a half peach, as shown in Figures 18 and 19. Pinned on the bottom of the pin 188 as at 218 is a lever 220 carrying a roller 222. The lower or opposite end of pin 190 has pinned thereto as at 224 a lever or arm 226 which at its opposite end has one end of a coil spring 228 fixed thereto. The opposite end of the coil spring 228 is fixed to the end of another lever 230 pinned as at 232 to the lower end of the vertical pin 192, see Figure 18.

By means of the foregoing, when the cam having the cam groove 104 is rotated, the outer periphery thereof will operate the roller 160, see Figure 9, which in turn will swing the lever 158 to operate the lug 156, see Figures 9, 17 and 18, which in turn will swing the roller 222 on the arm 220 and this arm 220, see Figures 9 and 18, operating through pin 218, will not only turn the sector 196, but will also shift the intermeshed segment 204 which in turn will shift the segments 210 and 212, which will shift the clamping members 202, 208 and 216 equal distances relatively to clamp the whole peach, as shown in Figure 19. This is the vertical position of the jaws wherein the clamping members 202, 208 and 216 are disposed vertically and are holding the whole peach for the sawing operation. Subsequently to this, when the whole peach is sawed into halves as thus held, the rollers 126 will be operated by the cam grooves 104 and 106 simultaneously to shift the racks 124 and these in turn will operate the toothed segments 168 to shift the plates 174 as they successively are turned by drum 8 to a predetermined position in shifting from the peach sawing station to the half peach pitting station. The shifted positions of the plate 174 are shown in dotted lines in Figure 8. In this manner the two cut half sections of the fruit will be shifted to the horizontal position as shown in full lines in Figures 8 and 18. Thus each half peach, with its cut face held in a horizontal position and in spaced apart relation, will be brought from the sawing station to the pitting station. There will be a pitting mechanism over and moving with each half peach as the latter are uninterruptedly moved by the continuously turning drum 8.

It will be seen from the description of the gripper jaws for holding the whole peach, that each whole peach will be held by the jaws in position under each pitting apparatus. By reference to Figure 12 it will be seen that the pitting mechanism swings twenty-six degrees with the rotating drum 8 at the start of and end of the pitting operation, as indicated by the lines $x$ and $y$, respectively. The pitting operation is completed while the rotating drum is turning. Upon the completion of this pitting operation the rotating drum 8 thus continuing to turn, automatically moves the fruit clamping jaws from under the pitting blades and in so turning the operating roller acting on its cam opens the gripper jaws to release the fruit into a chute, see Figures 22 and 23. Then the roller 126, see Figure 8, acting in the cam race 104 through the toothed rack 124 and the gear sector 168, turns the plate 174 and the gripper jaws 208 and 216 carried by the plate on the pin 162 from a position such as shown in Figure 18 to a position such as shown in Figure 17 wherein the upper portion of the jaws are at right angles to their position shown in Figure 18, which means that the jaws in Figure 17 are at right angles to the face of the drum 8.

Means is provided for feeding whole peaches in predetermined relation to the constantly turning drum. The feed shaft 38, see Figures 1, 3, 5, 6 and 7, is mounted in the bearing brackets 326 and 328. Keyed to the ends of the feed shaft are brackets 330 which turnably support an angular plate 332, see Figures 6 and 7. Mounted upon this turnable plate 332 is a tubular shaft 334, see Figures 6 and 7. Fastened to the frame 4 is a thin vertical plate 336 which has a relatively large opening therein, the inner walls of which are spirally shaped as at 338, see Figures 3 and 7. In addition, this spirally shaped plate is provided with a sharpened tip such as 340, see Figure 3, extending upward to receive peaches and is also provided with two laterally extending arms or plates 342 and 344 for the additional support of the fruit at this in-feeding station, see Figures 1 and 2. In other words, this plate, including the horn 340 and the two laterally disposed side plates 342 and 344 provide a receiving platform on which a whole fruit may be deposited and from which the whole fruit is gripped by spaced feeding arms hereinafter to be described and which feeding arms move the whole fruit into position between the respective and successive pairs of gripping jaws carried by the continuously rotating turret. Slidably mounted in the hereinbefore mentioned rotatable tubular shaft 334 are oppositely extending fruit centering rods 346 and 348. These rods at their outer ends, as shown in Figure 6, are suitably slotted so as to receive in the opposite ends the inner spirally shaped edges of the vertical stationary camming plate 336. Within this tubular shaft 334 and between the spaced rods 346 and 348 is a coil spring 350 which exerts an outward pressure on each of these rods 346 and 348 whereby the rods are mutually pushed outwardly by this centrally disposed spring 350. Hence this spring presses against the inner ends of the rods and pushes the rods outwardly against the spirally shaped inner wall 338 of the stationary cam 336.

Each rod 346 and 348 carries a pivotal pin. Thus rod 346 carries the pivotal pin 376 and rod 348 carries the pivotal pin 382. Two pairs of fruit gripping jaws are pivotally mounted on the turnable plate 334. For instance, the fruit gripping jaw 356 is pivoted at 357 to the plate 332 and the fruit gripping jaw 358 is pivoted at 359 to the plate 332. The oppositely extending fruit jaw 352 is pivoted at 353 to the plate 332 and the paired gripping jaw 354 is pivoted as at 355 to the plate 352. Linkage means is arranged to connect these pairs of jaws with their respective pivots on the slidable rods 346 and 348. The links 360 and 362 are pivoted as at 378 and 380 to the jaws 356 and 358 respectively, and the opposite ends of these links 360 and 362 are pivoted to the pivotal point 376 on the rod 346. So also the jaw 352 has a link 364 pivoted to it at 384 and also the jaw 354 has pivoted to it the link 366 at the pivot point 386. The inner ends pivot together at the pivot 382 on the rod 348. By means of this arrangement the jaws 356 and 358 have one pair and the opposite pair of jaws 352 and 354 are automatically opened and closed in timed relation with the swing of the tubular arm 334 on the turnable plate 332 about the axis of turning of the shafts 38, and by reason of the sliding interconnection between the split outer ends of the rods 346 and 348 engaging the curved camway 338 on the vertical cam 336 the rods move inwardly and outwardly and thereby oscillate the linkages to open and close the pairs of jaws in timed relation as they move with the shafts 38 with respect to the cam 336. By reference to Figure 1 it will be seen that when the peach P is placed on the shelf 342 and as the tubular arm 334 turns by reason of the shape of the cam surface A which is the inner wall 338 of the cam 336, the jaws will be opened at the proper time to be opened as they come opposite the peach P on the ledge 342, at which time the jaws will then immediately close to grasp the peach and carry it around to the jaws 208 and 216 which are on the rotatable turret. There is a definite interrelation or timing in the movement of these jaws, their opening and closing, and the movement of the turret and the jaws 202, 208 and 216 on the turret. When the peach, carried by the pairs of jaws 356 and 358 and 352 and 354, arrives in registration with the jaws 202, 208 and 216 on the turret, the latter jaws will be opened to receive the peach and the pairs of jaws on the rotatable tube 334 will then open to release the peach so that it can be grasped by the three jaws 202, 208 and 216 on the turret.

The pitting mechanism

Means is provided, in asosciation with this continuously rotating drum 8, for pitting the half peaches which are now held by the fruit holders 208 and 216 and other cooperative means with their cut faces in horizontal spaced apart position whereby the pitting is acomplished by a pitting mechanism which moves with the continuously moving drum and with the half peaches carried thereon without interrupting the movement of the drum and the half peaches.

In order to accomplish this there are provided two upright pivoted arms 230 and 232 which have bearings 234 and 236 on the shaft 10, as previously described, see Figures 1, 2, 3 and 5. At the top of these arms 230 and 232 are two cross angle plates 234 and 236, see Figures 14 and 15, which tie the two arms 230 and 232 together and form a rigid support or pitter head 231 for the pitting heads. Bolted to the bottoms of these arms 230 and 232 is another angle plate 238, see Figure 3, and connected to this plate by a pin 240 is a connecting link 242. A spring 244 passes through a second angle plate 246, whereby the springs 244 and 248 may steady and cushion the oscillating movement of the arms 230 and 232.

By reference to Figures 1 and 24 it will be seen that mounted on the angle plate 234 and 236 are bearing brackets 84 and 86 for the shaft 82. On the shaft 82 are two segment gears 250 and 252 the teeth of which mesh with the teeth of the racks 254 and 256 which slide in the brackets 258 and 260. The bracket 260 is fastened to the rack 254, see Figures 9 and 24. Studs 262 and 264 hold the pitter drive arms 266 and 268 to the bracket 260. The arms 266 and 268 drive the pitting blade carriers 270 and 272 which operate the pitting head. This pitter mechanism is constructed and operates in the manner disclosed in the prior patent to Raymond L. Ewald and Henry A. Skog, No. 2,216,165, patented October 1, 1940, except that in the present case, due to the manner in which the whole peach and the half peaches are gripped at locations removed from the line of severance through the whole peach adjacent the suture plane, as hereinbefore described, and due also to the backing-up mechanism shown in Figures 12, 14 and 15, there is eliminated the need of the apertured presser plate 662 of the prior Patent 2,216,165, whereby considerable simplification of the pitting mechanism is afforded. It will be noted that the present invention differs from that of the prior patent aforesaid mentioned in that the prior patent provides that the half peach be held in a cup mechanism which completely supports the bottom curved portion of the peach during the pitting operation, whereas in the present invention each half peach is centralized and held by gripping members which engage the curved surface of the peach at three points adjacent the line of halving severance of the pit, and likewise the half peach is adjustably supported by means of the button or abutment 392 which itself shifts relatively into contact with the under, curved surfaces of the held half peach prior to the descent of the pitting blades to act merely as a backing-up member. The peach has already been centralized in position with respect to the pitting zone by the three spaced apart gripping members and the button 392 merely acts as a backing-up member to resist the downward pitting action of the pitting blades and to maintain the fruit in centralized held position during pitting action.

Figure 13:
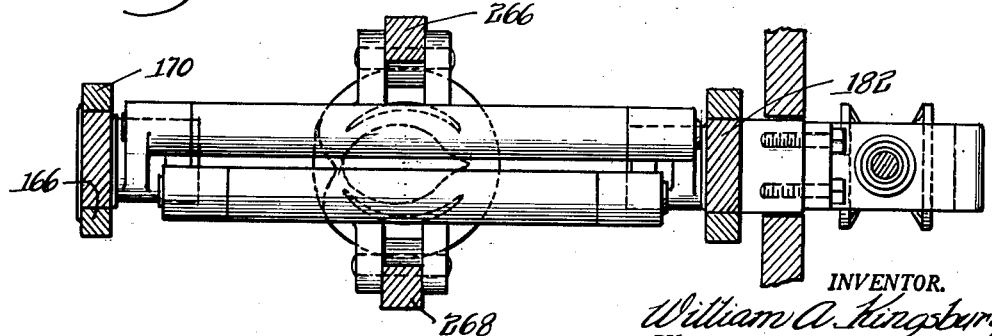
Figure 13 is a section taken on the line 13—13 of Figure 12.

The fruit support 392 is mounted on the lever arm 390 which is pivoted at 394 to the bracket 396 bolted to the oscillatable arm 230. This bracket carries the ratchet teeth 400. Pivotally mounted at 418 on the arm 390 is a pawl 406. Springs 410 and 412 surround the pivotal shaft 418 of this pawl, as shown in Figure 16, the springs being suitably anchored so as to cause the pawl 416 normally to turn into engagement with the teeth of the ratchet 400. Pivoted to the bottom of the pawl is the long rod 422 the lower end of which pivotally connects to a plate 424 which is pivoted at 434 to a bracket 425 in turn bolted to the oscillatable arm 230. The plate 424 has rotatably mounted thereon a roller 428. This roller is adapted normally to engage the undersurface of a stationary cam-like track 430. The movement of the oscillating arm 230, by reason of the foregoing, moves the roller 428 along the cam-like track 430 to a point such as A shown in Figure 13. This movement to the point A acts to pull the rod 422 downwardly which releases the pawl 406 from the ratchet teeth 400 and permits the arm 390 to be pulled down to its lowermost position so that the fruit in the gripper jaws can pass freely over the lowered arm 392 so as to position the peach. Upon the reversal of movement of the swinging arm 230 the arm 422 is pulled upwardly by the spring 438 to cause the support 392 to engage the lower surface of the peach, and at the same time the springs 410 and 412 force the pawl 406 into adjustable engagement with the stationary teeth 400 of the ratchet whereby adjustably to hold the support 392 in contact with the peach in the desired position. In this way the support 392 is adapted to form a lower backing-up support for the peach, irrespective of the size or diameter of the half peach.

Figure 12:
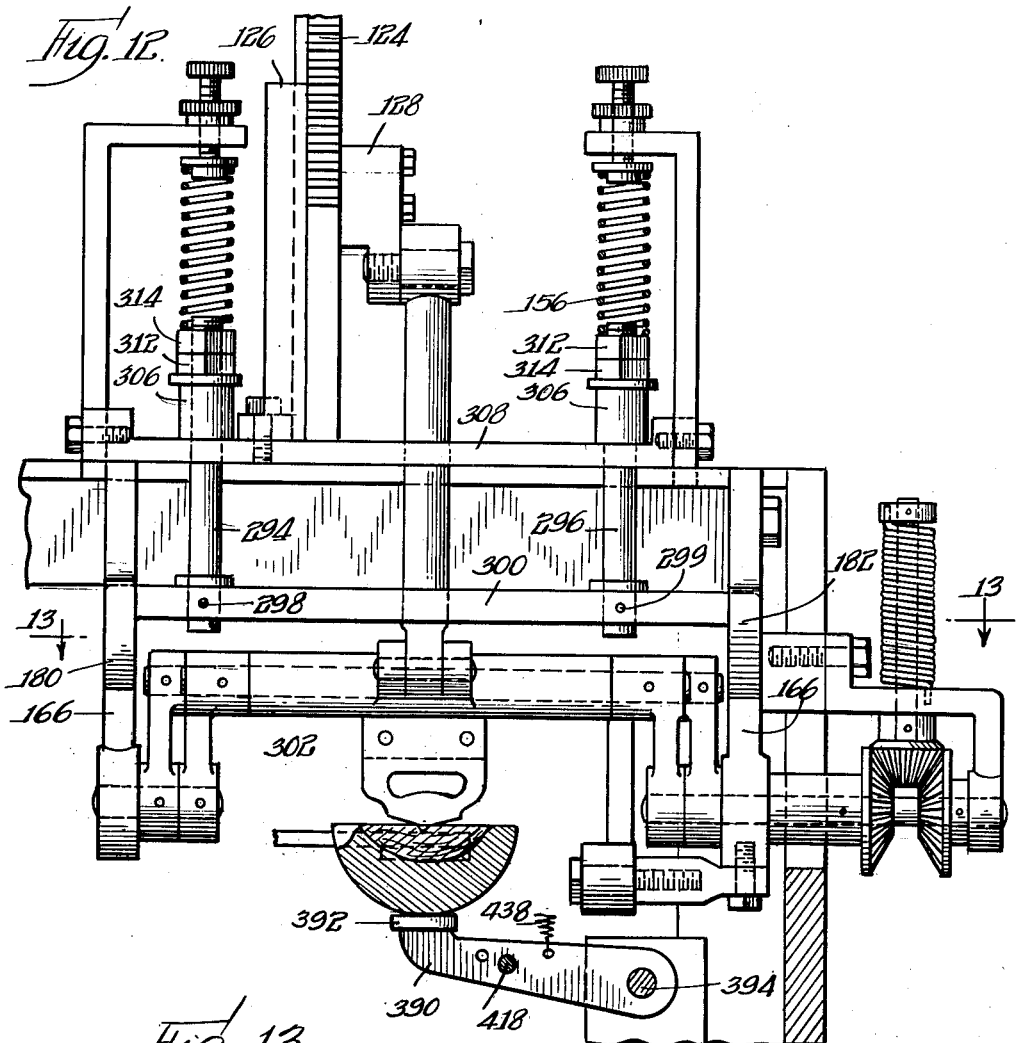
Figure 12 is a front view of one of the pitting mechanisms.

Reference to Figure 5 shows that brackets 274, 276, 278 and 280 support the compression springs 282, 284, 286 and 288, and the rods 290, 292, 294 and 296 are pinned as at 298 and 299 to the V-frame 300 of the pitting heads 302 and 304. The thimbles 306 are fastened to the supporting plates 308 and 310. The rods 290, 292, 294 and 296 pass through the thimbles 306 and have two nuts 312 and 314 on the top end. The ends of the V-frame 300, see Figures 9 and 12, are in vertically disposed slides 314, 316, 318 and 320, see Figure 5, which holds the V-frame firmly but allows it to move up and down. These guides 314, 316, 318 and 320, as shown in Figures 9 and 10, are slotted as at 322 to receive the pitting heads to permit the pitting heads to slide vertically and thus move up and down.

*Operation*

In the operation of the device, as shown in Figure 1, the main turret is continuously rotated by the motor shaft 46 through the instrumentality of the belt chain 42 and the various driving connections illustrated in Figures 3 and 5, the saw 55 is continuously rotated, the pitter carrying bridge 230 is continuously oscillated approximately twenty-six degrees, as seen in Figure 22, and the feeding arms 348 are continuously rotated. Starting then with the whole peach positioned on the horn of the stationary cam as shown in Figure 2, with the dimple end resting on the plates 342 straddling the horn 340 and with the longitudinal stem axis A of the whole peach extending in the direction indicated in Figures 1 and 2, as the feed arms 348 are continuously rotated in a clockwise direction as shown in Figure 3 and in a counterclockwise direction as shown in Figure 1, the arms 348 are opened as they move upwardly toward the stationary whole peach which has been placed thereon by the operator. As the arms come opposite and pass upon opposite sides of the stationary whole peach, the cam track causes the spaced arms to come together to grip the whole peach therebetween. The peach is then carried in the manner shown in Figure 3 into position to be grasped by the opposed pairs of gripper fingers 208, 202 and 216 of these arms, there being two pairs which in this position are open to receive the whole peach. The open position of the arms is shown in Figure 1, which shows the whole peach being held by the arms 348 centralized so as to hold the peach just in the correct position so that the gripper fingers 202, 208 and 216 may grip the peach therebetween. It will be remembered that during this time the drum 8 is continuously rotated and as it rotates it carries the three sets of peach gripping and centering members 202, 208 and 216 around with it and the coordination is such that one of each set of gripping members 202, 208 and 216 will arrive at the whole peach feed station shown in Figure 1 just as the whole peach feed arms 348 have arrived in this position and the mechanism for operating the arms which is shown in Figures 8, 9, 17, 18 and 19, now comes into operation during the movement of the turret 8 to cause the gripper fingers 202, 208 and 216 to move equal distances whereby to grip the peach and centralize it, be it a small peach or a large peach, in the manner indicated in Figure 19. It is to be borne in mind that since these gripper arms 208, 202 and 216 are all interconnected they will move simultaneously equal distances, and hence the center of the peach, irrespective of its size, is always maintained at the point marked C in Figure 19.

By reference to Figure 8 it will be seen that each set of jaws disposed radially about and carried by the constantly moving drum 8 is composed of two groups or sets and that each set or group in turn is composed of three jaws. The two groups are shown in Figure 8 and the position there illustrated for holding the whole peach P comprises the right hand set shown in Figure 8, the right hand group comprising the fingers 202, 216 and 208, and the left hand set also comprising the gripper fingers 202, 208 and 216. The fingers of each set are spaced from each other on equal sides of the central vertical plane or line B an equal distance which is of predetermined width. This line B corresponds, of course, to the plane of operation of the saw 55. In the position shown in Figure 1 the jaws are in normally open position and are just about to be automatically closed by the operating mechanism so as to grip the whole peach in the manner shown in Figures 8 and 19. In Figure 8 the gripping mechanism is shown in dotted lines as gripping the whole peach P. It will be noted that the whole peach is gripped circumferentially in six different places. For instance, referring to the large whole peach P of Figure 19, the peach is gripped along the zone 209 and also along the zone 203 and also along the zone 217. With respect to the small peach P¹, these same jaws will grip the small peach along the zone 209' and along the zone 203' and along the zone 217', moving inwardly and outwardly in accordance with the diameter of the whole peach so as to constantly maintain the center of the peach, be it large or small, at the point C which is also related to the center of action of the pitting mechanism as hereinafter explained. By reference to Figures 8, 19 and 20, it is important to note that the two sets of spaced gripper fingers are spaced back of the plane B which is the line of severance for the operation of the saw. Hence it will be seen that in the construction of this invention the peach is not gripped or held at the points $P^3$ or $P^4$ as in many other devices.

Referring now to Figure 1, the peach thus gripped by the jaws 202, 208 and 216 of the continuously rotating turret is thence carried in a clockwise direction through the rotating saw 55 which severs the flesh of the whole peach P and also its pit. The turret, continuing to revolve, carries the now severed halves, each set of gripper jaws comprising three jaws each as shown in Figures 8 and 9, and moves upwardly approaching the zone of operation of the swinging pit carrying mechanism. This movement is shown diagrammatically in Figure 22. Prior to the split peach reaching the position Z, Figure 22, the turret operating mechanism, shown in Figures 8, 9, 17 and 18, has been actuated to shift the carriers 174 for the peach gripping members 202, 208 and 216 to a downward position as shown in Figure 8 so that the peach halves are now shifting so that their cut faces lie in a common horizontal plane on opposite sides of the plane B. This position is also shown in Figure 5. About this time the pitting carrier oscillating bridge head 231 will have reached the point Z, Fig. 22, which is the outermost point of its direction of travel in the counterclockwise direction. At this point it reverses and picks up fast, moving clockwise at the arcuate speed of travel of the turret 8. During this time the pitting blades, as hereinbefore described, are brought down onto the face of the half peach and the blades are then arcuately operated as in accordance with the prior Ewald and Skog patent noted, to accomplish the pitting action. It is to be pointed out that the backing-up member 390 or 392 shown in Figures 8 and 15 has been pulled downwardly out of the way in order to permit the oscillating movement of the bridge head 231 but that prior to the pitting movement this backing-up member 390 or 392 is moved adjustably upwardly to contact the underside of the curved surface of the half peach, as in Fig. 8 to provide a firm backing therefor to resist the downward pitting movement of the peach pitting knives. It is particularly pointed out at this point that this backing-up member 392 is positioned just before the pitting takes place and in nowise provides a means for determining the position of the peach half. In fact, it is just the reverse because the position of the gripped peach half determines the position at which the backing-up member is raised to form a firm backing member during the peach pitting action. The location of each peach half is dependent upon the centralizing action of the gripper jaws as hereinbefore described, and by reason of the centralizing action of these gripper jaws it can be seen that the cut face of each half peach is placed in an exactly predetermined position with respect to the regulated standardized zone of action of the pitting knives, and further, that due to the centralizing action of the equally moving gripper jaws 202, 208 and 216, the center of each half peach, be it large or small or intermediate in size, is always brought to the point C so that the pitters will centralize about the half pit and likewise always form a correct cavity with respect to the pit in the pitting action.

By means of this novel action I have been able to eliminate the necessity of a perforated plate or any other member of similar function to contact the cut face of the half fruit during the pitting as has heretofore been required. These plates have considerable disadvantage in that they mar the cut face of the half fruit as they press down upon the flesh of the half fruit, and if the pitting aperture is not large enough they interfere with the motion of the blades because of the differences in the sizes of the different peaches. Hence in the present invention with the novel type of peach gripping and centralizing mechanism I am enabled to eliminate the need of an apertured plate for the pitting of half peaches in an automatic manner and I am also enabled to pit a succession of variantly sized half peaches which are continuously moving in a constant succession and are being successively sawed and automatically fed to the pitting mechanism, and automatically centralized as they are thus fed, so that the pitting knives will always make a properly centered pitting action.

After the pitting action has taken place the backing-up member 392 is withdrawn in the manner hereinbefore set forth. The peach clamping jaws are automatically released in the manner hereinbefore set forth, and the half peaches are dropped into the discharge chutes, all as shown in Figures 22 and 23.

Obviously the invention is not limited to the specific details of construction disclosed herein but is capable of other modifications and changes without departing from the spirit and scope of the appended claims.

Having thus described the invention, what is claimed as new and desired to be secured by Letters Patent is:

1. In combination, a support, a carrier mounted thereon, means for continuously moving said carrier on said support, a plurality of sets of peach centering means shiftably mounted on said carrier and spaced apart in a direction transversely of the direction of travel of the carrier, each set comprising a plurality of peach gripping and centering members disposed about a common center, means operatively interconnecting said gripping members for equal movement inwardly and outwardly of said center, means for shifting the members of each set bodily into spaced adjacency to be positioned to grasp a whole peach by means of the members of said sets of gripping means and to center the peach by relative inward movement of said centralizing members of said sets, means operative between said members of said spaced sets to bisect the peach, leaving each set centralizingly gripping a bisected half peach and means thereafter shifting the sets oppositely outwardly of said adjacent confronting position to substantially spaced apart position whereby to place the center of each half peach in registration with the zone of pitting action of a pitter, and pitting means movably mounted on said support and bodily shiftable with the half peaches grippingly carried by said continuously movable carrier and operable as said pitter so moves for shifting movement relatively to the cut face of each held half peach for pitting the same.

2. In combination with a stationary support, a carrier continuously movable thereon, a plurality of spaced sets of fruit centering and gripping means shiftably mounted on said carrier in spaced relation thereon in a direction transversely of the direction of travel of said carrier, each set of fruit centering and gripping means comprising a plurality of peach centering and gripping members and there being means interconnecting and actuating the members of each set to move the same equal distances toward and from a common center, said gripping members gripping the whole peach on opposite peripheral portions disposed to leave an ungripped zone at and on each side of a plane passing through the suture of the peach, peach bisecting means operable substantially through said plane to bisect the peach, leaving each half peach centered and held by the gripping members of a single set, means operative to shift each set outwardly oppositely and angularly to shift the cut face of each half fruit to spaced relation to position the centers of each half fruit laterally of and spaced from said plane through which the whole peach was bisected, and peach pitting means comprising a pair of spaced pitters each having peach severing means operable with respect to the centers of each half peach when so positioned laterally of said suture plane, means for causing said pitters to move bodily with the centered and gripped half peaches carried by said continuously moving carrier and means for actuating said pitters while so moving to pit the half fruits.

3. In combination with a support, a conveyor movable along said support, a pair of fruit centering and gripping means shiftably mounted on said conveyor for movement therewith and relatively thereto, each means comprising a plurality of spaced peach centering and peach gripping members operable to contact peripherally spaced portions of a whole peach, means interconnecting the gripping members of each pair simultaneously to move equal distances toward and from a common center of each pair, means operable as an incident to movement of said conveyor along said support for shifting each pair of members laterally and angularly into confronting spaced relation so that the gripping and centering members of both pairs mutually are operable to so grip and center the whole peach with the suture plane thereof disposed between the spaced zones of peripheral contact of said gripping members on said peach, means for thereafter bisecting said whole peach while so held leaving each severed half peach grippingly held solely by the members of a single gripping and centering means, means for thereafter oppositely and angularly shifting the pair of fruit gripping and centering means to spread apart the cut faces of the severed half peaches and to shift the planes of said cut faces from confronting position to positions angularly disposed thereto and to position the centralized portions of each of said cut faces of half fruits each in registration with predetermined centers of action of spaced pitting members, and means on said support providing a pair of spaced, shiftable pitting members operable in the last mentioned position of said half fruit sections to contact the centralized pit zones of said half fruits to pit the same.

4. In combination with a support, a conveyor movable along said support, a pair of fruit centering and gripping means shiftably mounted on said conveyor for movement therewith and relatively thereto, each means comprising a plurality of spaced peach centering and peach gripping members operable to contact peripherally spaced portions of a whole peach, means interconnecting the gripping members of each pair simultaneously to move equal distances toward and from a common center of each pair, means operable as an incident to movement of said conveyor along said support for shifting each pair of members laterally and angularly into confronting spaced relation so that the gripping and centering members of both pairs mutually are operable to so grip and center the whole peach with the suture plane thereof disposed between the spaced zones of peripheral contact of said gripping members on said peach, means for thereafter bisecting said whole peach while so held leaving each severed half peach grippingly held solely by the members of a single gripping and centering means, means for thereafter oppositely and angularly shifting the pair of fruit gripping and centering means to spread apart the cut faces of the severed half peaches and to shift the planes of said cut faces from confronting position to positions angularly disposed thereto and to position the centralized portions of each of said cut faces of half fruits each in registration with predetermined centers of action of spaced pitting members, and means on said support providing a pair of spaced, shiftable pitting members operable in the last mentioned position of said half fruit sections to contact the centralized pit zones of said half fruits to pit the same, and additional half fruit supporting means mounted on said support and means for shifting such a supporting means into contact with that peripheral portion of each half peach that lies opposite the cut face of each said half peach to provide a support for each half peach to resist the pressure of the pitting means on the opposed cut face of the half fruit during pitting.

5. In combination with a support, a conveyor movable along said support, a pair of fruit centering and gripping means shiftably mounted on said conveyor for movement therewith and relatively thereto, each means comprising a plurality of spaced peach centering and peach gripping members operable to contact peripherally spaced portions of a whole peach, means interconnecting the gripping members of each pair simultaneously to move equal distances toward and from a common center of each pair, means operable as an incident to movement of said conveyor along said support for shifting each pair of members laterally and angularly into confronting spaced relation so that the gripping and centering members of both pairs mutually are operable to so grip and center the whole peach with the suture plane thereof disposed between the spaced zones of peripheral contact of said gripping members on said peach, means for thereafter bisecting said whole peach while so held leaving each severed half peach grippingly held solely by the members of a single gripping and centering means, means for thereafter oppositely and angularly shifting the pair of fruit gripping and centering means to spread apart the cut faces of the severed half peaches and to shift the planes of said cut faces from confronting position to positions angularly disposed thereto and to position the centralized portions of each of said cut faces of half fruits each in registration with predetermined centers of action of spaced pitting members, and means on said support providing a pair of spaced, shiftable pitting members operable in the last mentioned position of said half fruit sections to contact the centralized pit zones of said half fruits to pit the same, and additional half fruit supporting means mounted on said support and means for shifting such a supporting means into contact with that peripheral portion of each half peach that lies opposite the cut face of each said half peach to provide a support for each half peach to resist the pressure of the pitting means on the opposed cut face of the half fruit during pitting, and means automatically operative on the completion of the pitting operation for removing said additional support from engagement with the periphery of each half peach.

6. In combination with a support, two spaced, whole fruit centering and supporting means shiftably mounted thereon, each one of the centering and supporting means comprising a plurality of spaced fruit centering and gripping members, means interconnecting said members for movement equal distances toward and from a common center, means relatively to move said pair of units into spaced confronting adjacency and for so equally moving the members of the pair toward said common center peripherally to grip a whole peach on opposite sides of and substantially equally spaced from the suture plane of the whole peach, said members of said sets centering the substantially central portion of the whole peach with respect to said predetermined center and irrespective of the size of the peach, means operative as said whole peach is so held to bisect said peach substantially through its suture plane to form two half peach sections with their cut faces confronting and each half peach being solely gripped by the centering and gripping members of a single set and at spaced peripheral portions that lie adjacent the plane of the cut face of each half fruit, said cut face and the curved periphery of each half peach being free of gripping or peach contacting devices, means operative to thereafter bodily shift each set of gripping and centering devices oppositely outwardly away from their former positions to spaced angularly disposed positions whereby to position the half peach sections with their cut faces lying at an angle to and equally spaced from and on each side of the plane of severance formed by said bisecting means, and with the cut faces of each half peach completely and entirely exposed, abutment means operative in such latter positions of said gripped half fruit sections to contact the curved periphery of each peach that lies opposite its cut face, pitting means for each half peach operative to shift into contact with the cut face of each gripped half fruit, each said pitting means being positioned to have its central zone of action register with the center of one of the half peaches so centralized and held by said peach centering and gripping members of the set holding such half peach.

7. A peach processing machine comprising a support, movable whole peach feeding means thereon comprising a pair of relatively shiftable whole peach holding jaws adapted to grasp a whole peach at diametrically opposed peripheral portions, the central axis of which portions passes at right angles through a plane in which the suture plane of said held peach lies, an endless conveyor movably mounted on said support and having mounted thereon a pair of peach gripping and centering means, the two such means of said pair being mounted equal distances on opposite sides of said plane, and each of said centering and guiding means comprising a plurality of spaced apart peach gripping and centering members, there being means operatively interconnecting said members to cause them to move equal distances inwardly toward a common center centeringly to grip spaced peripheral portions of the whole peach which portions lie on opposite sides of and at substantially equal distances from, yet adjacent to, the suture plane of the whole peach, means for relatively moving said whole peach feeding means and said conveyor to cause said whole peach feeding jaws of said whole peach feeding means when gripping a whole peach to position said whole peach between the spaced confronting pair of peach centering and gripping members mounted on said conveyor, said whole peach feeding jaws thereafter releasing said whole peach whereby said peach is thereafter gripped solely by the gripping and centering means of said movable conveyor, bisecting means operative to sever the whole peach through the suture plane, leaving two half fruits with their cut faces confronting and each half fruit gripped solely by the spaced peripheral gripping members of one only of the pair, means for thereafter shifting each one of the pair of said centering and gripping members outwardly oppositely and angularly to position the half fruits thus gripped in equally spaced positions outwardly and angularly from their prior positions when so severed, and pitting means movable on said support to pit each of said half fruits.

8. In a device of the class described, the combination of a stationary support, a conveyor movable in an endless path on said support, means for so continuously moving the conveyor, fruit bisecting means mounted on said support and disposed to operate in a plane bisecting at least a portion of the path of travel of said conveyor, a fruit pitting head mounted on said support for movement in the same direction as the conveyor during another portion of the path of travel of the conveyor, means for moving said pitting head adjacently to the conveyor and in the same direction as the conveyor moves when moving along said second portion of its path of travel and at the same rate of speed as said conveyor, said means including mechanism for also reversely moving said pitting head in the opposite direction along said second mentioned path of travel, pitting means shiftably mounted on said head including a pair of pitter blades disposed oppositely and equally laterally of a plane bisecting said other portion of the path of movement of the conveyor, fruit holding and centering means shiftably mounted on said conveyor for continuous movement therewith and for movement relatively thereto, said fruit holding and centering means comprising a plurality of sets of fruit gripping and centering members shiftably mounted on said conveyor in spaced relation thereon, each set of fruit gripping members comprising a plurality of spaced fruit holding members, there being means operatively interconnecting the spaced fruit holding members to cause said members of each set to move simultaneously equal distances toward a common fixed center to grip each peach of a succession of variant sized peaches and to centralize each peach, irrespective of the size of the peach, with respect to said fixed center, means operatively related to the movement of said conveyor to cause said sets of fruit gripping and centering means so mounted on said conveyor to so move inwardly to grippingly centralize a whole peach and to convey said gripped whole peach so that said whole fruit is bisected along a plane lying between the zones of gripping action of the respective members of said sets of fruit gripping means, means operative after the bisecting of said whole fruit to oppositely shift each set of fruit gripping members while the members of each set grips a centralized half peach whereby to bodily and oppositely shift said two peach sections laterally from a position with their cut faces adjacently confronting to positions such that each half peach is positioned with its center registering with the center of operation of a pitting blade and with the cut faces of the two peach halves spaced apart and shifted angularly and laterally with respect to a plane passing through the plane of bisection of said peach, and means actuated in timed relation with the movement of said conveyor as each half section is so centralized with respect to the center of the zone of operation of a pitter blade for actuating each pitter blade to move toward the cut face of the half peach and to pit each half fruit while each half fruit is continuously moving with said conveyor.

9. The herein described method of pitting whole peaches which comprises gripping the curved walls of a whole peach at spaced zones disposed arcuately about a whole peach at opposite sides of and at substantially equal distances from a plane parallel to and substantially passing through the suture plane of the whole peach, continuously moving said whole peach while so gripped along a predetermined path, cutting through the peach and the pit thereof on said plane while the whole peach so gripped is continuously moving, swinging each half peach simultaneously substantially ninety degrees while continuously moving whereby to bring the cut faces of each half peach into a common plane lying at right angles to the plane through which the cutting took place, continuously moving the peach halves in parallel paths while so gripped and simultaneously pitting each half peach while so continuously moving along said parallel paths.

10. An apparatus for processing whole peaches which comprises a support, a carrier mounted on said support, means for continuously moving said carrier in an endless path thereon, whole peach gripping means mounted on said continuously moving carrier including a plurality of sets of spaced gripping members cooperatively shaped to grip the curved outer surfaces of a single whole peach at a plurality of equally spaced zones about said curved surfaces and on opposite sides of a plane lying parallel to and substantially lying in the suture plane of the whole peach, the members of each set of peach gripping means being disposed equal distances on opposite sides of said last mentioned plane, means for cutting through that portion of a continuously moving whole peach and its pit lying between said opposed gripping devices, means for moving said cutting means and said peach gripping means so that said line of cut is formed parallel to said suture plane and in a plane disposed equidistantly from the opposed spaced apart gripping members of each set whereby to form two gripped half sections of peach with their cut faces juxtaposed, and means for relatively and oppositely shifting the gripping members of each set that grip those spaced portions of each whole peach that lie on opposite sides of said line of bisection whereby grippingly to position the two severed halves of the peach in a common plane with their cut faces shifted substantially ninety degrees from their former juxtaposed position, said shifting of the opposed halves being effected without interrupting the continuous travel of said peach halves, and means operating on the cut faces of the so shifted continuously traveling half peaches while each said half peach is gripped by one of said sets of gripping members for pitting each half peach.

11. The herein described apparatus for pitting whole fruits which comprises means for gripping a whole fruit at its curved surfaces on opposite sides at equal spaced distances from a plane parallel to and substantially passing through the suture plane of the whole fruit, means for continuously feeding the whole fruit so gripped along a predetermined path of travel, means for bisecting the whole fruit substantially through a plane lying parallel to and substantially bisecting that portion of the whole fruit between the gripped portions thereof and while so gripped and so continuously moving, means for shifting each severed half of the whole fruit substantially ninety degrees whereby to position the cut faces of the two half fruits in a spaced apart, parallel relation and substantially in a common plane while said half fruits are so being fed along said path and means disposed in relation to said common plane for cutting out the seed section of each of said half fruits as said fruit sections continue their uninterrupted movement along said path of travel.

12. The herein described method of pitting whole peaches which comprises gripping a whole peach at a plurality of points which points are solely located substantially equidistances away from and on opposite sides of a plane parallel to and passing substantially through the suture plane of the whole peach, said whole peach being otherwise unsupported, continuously moving said whole peach so gripped along a predetermined path of travel while severing through the whole peach and its pit as the whole fruit continuously travels along said plane disposed equally distant between said peach gripping members to form two gripped half peach moving sections with their cut faces confronting, and while said peach sections are continuously moving along said predetermined path of travel shifting said sections equal angular distances to a position such that said cut faces lie in a common plane and in spaced parallelism in such common plane, and thereafter pitting said sections while so held by said gripping devices and while so continuously travelling in said common parallel planes along said predetermined path of travel.

13. A device for pitting whole peaches which comprises the combination of a travelling support, a spaced plurality of means each shiftably mounted thereon for gripping a whole peach at a plurality of zones on its curved surface, said zones being located equidistantly from and on opposite sides of a plane lying parallel to and passing substantially through the suture plane of the whole peach, said peach being otherwise unsupported, means for continuously feeding said support and the gripping means together along a predetermined path of travel, means for cutting through said whole peach and its pit along said plane and while so being fed to provide two gripped half peaches with their cut faces confronting and travelling with said support, means operable while said gripping means are travelling in the same direction along said path for shifting said gripping members relatively to each other and relatively to said support equal distances angularly to position said gripped halves with their cut faces in a common plane and for causing the spaced peach halves to travel in the same direction in spaced relation, and pitting means shiftably mounted for movement relatively to said support, and means for causing the pitting means to travel with the cut faces of the half fruit and operable on the continuously moving faces of each half fruit for cutting into the cut face of each half fruit to pit the same.

14. In a device of the class described, in combination with a stationary support, a carrier rotatably mounted on said support, means for continuously rotating said carrier, a pair of spaced pitting means shiftably mounted on said stationary support, each to move forwardly with said continuously rotating carrier and thence to move reversely with respect to the movement of said carrier toward and from a pitting station having a predetermined center of action, fruit gripping means mounted on said continuously rotating carrier comprising a pair of gripping devices, each device including a plurality of fruit gripping fingers, means operatively connected with the fingers of each pair of devices for gripping a positioned whole peach at a plurality of zones about the curved surfaces of the peach and on opposite sides of a plane parallel to and passing substantially through the suture plane of the whole peach, said gripping members including means interconnecting the same whereby they move toward and away from each other arcuately equal distances to grip, hold and center the whole peach irrespective of the size of the whole peach, and rotatable means on said support and disposed in the path of travel of the carrier for cutting through the whole peach and its pit along said plane whereby to provide two half peaches with their cut faces confronting and with each half fruit held by a plurality of gripping fingers, means for bodily and angularly shifting said gripping devices relatively to each other and to said continuously travelling carrier as said carrier moves to position each of said half peaches in centralized position and with their cut faces lying in a common plane immediately beneath the center zone of each of said spaced pitting means, and means for operating each of said pitting means to cause the same to move with and substantially at the same speed as said carrier and the half peaches held by said gripping devices while moving with said carrier whereby to pit said half peaches without interrupting the travel of said peaches.

15. An apparatus for pitting peaches comprising a support, a single endless carrier movably mounted on said support for movement in an endless path, means for continuously moving said carrier substantially at a uniform rate of travel along said path, spaced fruit gripping means, means for shiftably mounting said fruit gripping means on said carrier to move at all times bodily with said carrier and also to move relatively thereto while so moving with said carrier, means actuatable during said continuous movement of the carrier for operating said fruit gripping means to receive a whole peach therebetween and automatically to close upon said whole peach and hold the same therebetween with the suture plane of the peach disposed in a predetermined plane extending between the spaced members of said fruit gripping means, fruit severing means disposed in the path of travel of the endless carrier and operative to sever the whole fruit and its seed section substantially through a plane parallel with and substantially coinciding with the suture plane of the whole fruit whereby to provide opposed fruit sections with their severed faces confronting, means for operating said fruit gripping means after the bisecting of the whole fruit and during the continuous movement of the endless fruit carrier to shift each of said spaced fruit gripping means ninety degrees while continuously moving with said carried whereby to swing each severed fruit section to a position so that the cut faces of the fruit sections lie in a common plane which plane is normal to the plane along which the fruit was severed during the severing operation, automatic pitting means, and means operable during continuous movement of the endless carrier for moving the pitting means adjacent and along a path substantially parallel to the cut face of each held half fruit and at substantially the same rate of movement as said carrier, and means for actuating said pitting means during said last mentioned movement of said pitting means for pitting the pit sections from the cut faces of the half fruit without interrupting the continuous movement of said carrier.

16. An apparatus for pitting peaches comprising a support, an endless carrier mounted on said support, means for continuously moving said carrier in an endless path, spaced fruit gripping means mounted on said constantly moving carrier and movable bodily continuously with said carrier, means for operating said fruit gripping means to receive a whole peach therebetween and automatically to close upon said whole peach and hold the same therebetween with the suture plane of the peach disposed in a predetermined plane extending between spaced members of a fruit gripping means, fruit severing means disposed in the path of travel of the endless carrier and operative during continuous travel of the carrier to sever the whole fruit and its seed section substantially through a plane parallel with and substantially coinciding with the suture plane of the whole fruit whereby to provide opposed fruit sections with their severed faces confronting, means automatically operable during the continuous movement of the endless fruit carrier for angularly shifting the fruit gripping means on the carrier to swing each severed fruit section to a position so that the cut faces of the fruit sections lie in a common plane which plane is normal to the plane along which the fruit was severed during the severing operation, operable pitting means, mechanism for moving said pitting means a substantial distance in the same direction as and at the same speed as the endless fruit carrier and then for reversing the direction of travel of the pitting means relative to the direction of travel of the carrier, and means for automatically actuating the pitting means to cut into the faces of the half fruit as said pitting means moves with the fruit halves a substantial distance to pit the same.

17. In a device for pitting fruit, the combination of a support, a fruit carrier mounted thereon, means for continuously moving said carrier in an endless path on said support, fruit gripping means mounted on said carrier for bodily continuous movement therewith, said fruit gripping means comprising spaced sets of fruit gripping members, means operably interconnecting the members of each set to grip arcuately spaced apart portions of the curved surface of the whole peach at spaced apart portions on opposite sides of a plane parallel to and substantially passing through the suture plane of the whole peach, the remaining portions of the whole peach being unsupported, means for actuating said fruit gripping members to so grip the fruit while moving continuously with the carrier, fruit severing means mounted on said support and operable upon movement of the endless carrier to sever the gripped fruit along said plane while so held by said gripping members whereby to provide a pair of friut sections, each being grippingly held and with their cut faces confronting, means automatically operative on movement of said fruit carrier for shifting said gripping means angularly whereby correspondingly to shift the severed fruit sections angularly to a position such that their cut faces lie at an angle to their former confronting positions, and spaced apart, pitting means shiftably mounted on said support, means for moving said pitting means in timed relation with the movement of said fruit carrier so as to cause the pitting means to move in the same direction and for a substantial portion of its travel at the same speed as the fruit carrier, means operative during a portion of said last mentioned movement of the pitting means to cause said pitting means to approach and cut into the severed faces of the half fruit sections to pit the same.

18. In a device for pitting fruit, the combination of a support, a fruit carrier mounted thereon for operation in an endless path, means for continuously moving said carrier in an endless path, fruit gripping means mounted on said carrier for bodily continuous movement therewith, said fruit gripping means comprising sets of fruit gripping members operably interconnected and constructed and arranged to grip arcuately spaced apart portions of the curved surface of the whole peach at spaced apart portions on opposite sides of a plane parallel to and substantially passing through the suture plane of the whole peach, fruit severing means mounted on said support and operable upon the continuous movement of the endless carrier to sever the gripped fruit along said plane while so held by said gripping members whereby to provide a pair of fruit sections, each being grippingly held and with their cut faces confronting, means automatically operative during movement of said fruit carrier for shifting said gripping means to shift the severed fruit sections to a position such that their cut faces lie angularly disposed to the planes of said formerly confronting faces and spaced apart, pitting means mounted on said support, means for moving said pitting means in timed relation with the movement of said fruit carrier so as to cause the pitting means to move in the same direction and for a substantial portion of its travel at the same speed as the fruit carrier, means operative during a portion of the movement of the pitting means to cause said pitting means to approach and cut into the severed faces of the half fruit sections to pit the same, and automatic means operative prior to the contacting of the pitting means with the cut face of the half fruit for supporting the opposed curved surfaces of each of the half peach sections lying between the gripped portions to resist the pitting action of the pitting means.

19. In a device for pitting fruit, the combination of a support, a fruit carrier mounted thereon for operation in an endless path, means for so continuously moving said fruit carrier, fruit gripping means mounted on said carrier for movement therewith, said fruit gripping means comprising sets of fruit gripping members, means operably interconnected with said members and constructed and arranged to cause said members to grip arcuately spaced apart portions of the curved surface of the whole peach at spaced apart portions on opposite sides of a plane parallel to and substantially passing through the suture plane of the whole peach, fruit severing means mounted on said support, means for operating said severing means during movement of the endless carrier to sever the gripped fruit along said plane while so held by said gripping members whereby to provide a pair of fruit sections, each being grippingly held and with their cut faces confronting, means automatically operative during the continuous movement of said fruit carrier for shifting said gripping means angularly whereby correspondingly to shift the severed fruit sections angularly to a position such that their cut faces lie substantially spaced apart, pitting means mounted on said support, means for moving said pitting means in timed relation with the movement of said fruit carrier so as to cause the pitting means to move a substantial distance in the same direction and for a portion of its travel at the same speed as the fruit carrier, means operative during a portion of said last mentioned travel of the pitting means to cause said pitting means to approach and cut into the severed faces of the half fruit sections to pit the same, and automatic means operative prior to the contacting of the pitting means with the cut face of the half fruit for supporting the opposed curved surfaces of each of the half peach sections between the gripped portions of each half peach to resist the pitting action of the pitting means, said last mentioned means being adjustable so as to form an adjustable backing for that portion of the curved surface of the half peach opposite the cut face thereof, and means for causing said adjustable means to shift variant distances to correspond with the radius of the half peach being pitted.

20. In a device for pitting fruit, the combination of a support, a fruit carrier mounted thereon for operation in an endless path, means for continuously moving said carrier in said path, fruit gripping means mounted on said carrier for continuous bodily movement therewith, said fruit gripping means comprising sets of fruit gripping members, means operably interconnected with said members and constructed and arranged to grip arcuately spaced apart portions of the curved surface of the whole peach at spaced apart portions on opposite sides of a plane parallel to and substantially passing through the suture plane of the whole peach, the remaining portions of the whole peach being unsupported, fruit severing means mounted on said support, means operable upon movement of the endless carrier to sever the gripped fruit along said plane while so held by said gripping members whereby to provide a pair of fruit sections, each being grippingly held and with their cut faces confronting, means automatically operative during said continuous movement of said fruit carrier for shifting said gripping means to shift the severed fruit sections to a position such that their cut faces lie spaced apart, pitting means mounted on said support, means for moving said pitting means in timed relation with the movement of said fruit carrier so as to cause the pitting means to move in the same direction and for a substantial portion of said travel at the same speed as the fruit carrier, means operative during a portion of the movement of the pitting means to cause said pitting means to approach and cut into the severed faces of the half fruit sections to pit the same, and automatic means operative prior to the contacting of the pitting means with the cut face of the half fruit for supporting the opposed curved surfaces of each of the half peach sections to resist the pitting action of the pitting means, said last mentioned means being adjustable so as to form an adjustable backing for that portion of the curved surface of the half peach opposite the cut face thereof, said adjustable means travelling variant distances to correspond with the radius of the half peach being pitted, and means for automatically retracting said backing member after the pitting operation to permit the continued movement of the endless carrier.

21. In combination with a support, fruit gripping means thereon, means for continuously moving said fruit gripping means along a predetermined path on said support, said gripping means comprising two sets of spaced apart fruit gripping members, each set including a plurality of interconnected members, means automatically operable during the continuous movement of said gripping means for simultaneously and equally shifting said members toward and from each other arcuately to grip the curved periphery of a whole peach on opposite sides of and equally spaced from a plane parallel to and substantially passing through the suture plane of the whole peach, means disposed adjacent the path of said moving gripping means for severing the whole peach substantially along said plane, means operative during said travel of said gripping means for relatively shifting the sets of fruit gripping means angularly with respect to one another in opposite directions whereby to shift the cut faces of the peach sections into spaced position, and means thereafter operable during continued movement of said gripping means for pitting the fruit sections, said pitting means moving a substantial distance with said fruit sections.

22. In a device of the class described, in combination with a continuously travelling support movable in a predetermined path, means for causing said support to move continuously in said predetermined path, fruit gripping means mounted thereon to travel therewith continuously and comprising two sets of spaced apart fruit gripping members, each set including three members operatively interconnected for simultaneous movement toward and from each other, said operative connections including means for moving said members equal distances simultaneously, said sets of members being constructed and arranged to receive a whole peach therebetween so that each set of three members grips spaced apart portions of the curved outer walls of the whole peach on opposite sides of a plane parallel to a plane passing substantially through the suture plane of the whole peach and at equidistances from said plane, means operative during the continuous travel of said support for bisecting the whole fruit so held, means for angularly shifting each of said sets of members, each gripping a severed half fruit section, away from said whole fruit receiving position to spaced half fruit pitting positions as said support travels, and means moving with said travelling support for pitting each fruit half while so held.

23. In a device of the class described, in combination with a travelling support, means for continuously moving said support in a predetermined path, fruit gripping means mounted on and movable continuously with said support comprising two sets of spaced apart fruit gripping members, each set including a plurality of members, means operatively interconnected for simultaneous movement toward and from each other, said means including operative connections for moving said members equal distances simultaneously, said sets of members being constructed and arranged to receive a whole peach therebetween so that each set of three members grips spaced apart portions of the curved outer walls of the whole peach on opposite sides of a plane parallel to a plane passing substantially through the suture plane of the whole peach and at equidistances from said plane, means operative during movement of said support for severing said whole peach substantially along said plane, means operative during the further continuous movement of said support for shifting each set of members to cause said sections to be shifted relatively angularly by its own set of fingers to position each severed peach section so that the cut faces thereof are spaced apart and do not confront one another, pitting means, and means operable during the continuous travel of the held peaches in their shifted positions for causing said pitting means to travel with and to cut into the cut faces of said peach halves to pit the same.

24. In combination with a continuously movable support, means for so moving said support, fruit gripping means mounted on said support comprising two sets of fruit gripping members, each set including a plurality of spaced apart members, means interconnecting said members to cause their simultaneous and equal movements toward and from each other, said sets of members being constructed and arranged whereby two half fruits with their cut faces confronting may be disposed between the sets and wherein the members of one set independently grip the curved surfaces of one peach section adjacent the cut face thereof, the remaining portion of the curved surface being wholly unsupported, and the other set of members similarly grip the other half fruit section, and means on said support operative during a predetermined time in the continuous movement of said support for automatically and relatively shifting said sets of fruit gripping members angularly with respect to each other to shift the cut faces of the half fruit away from confronting position.

25. In combination with a movable support, means for continuously moving said support, fruit gripping means mounted on said support comprising two sets of fruit gripping members, each set including a plurality of spaced apart members, means interconnecting said members for simultaneous and equal movements toward and from each other, said sets of members being constructed and arranged whereby two half fruits with their cut faces confronting may be disposed between the sets, the members of one set independently gripping the curved surfaces of one peach section adjacent the cut face thereof, the remaining portion of the curved surface being wholly unsupported, and the other set of members similarly gripping the other half fruit section, and means on said support operative during a predetermined time in the continuous movement of said support for automatically and relatively shifting said sets of fruit gripping members angularly with respect to each other to shift the cut faces of the half fruit substantially away from confronting position such that the cut faces of the half fruit lie in spaced apart relation, each being held by its own set of gripping members.

26. In a fruit processing machine, the combination of a movable carrier, means for continuously moving said carrier, fruit gripping means mounted thereon comprising two sets of spaced apart fruit gripping members, each set comprising a plurality of fruit gripping members, means interconnecting said members to cause them to move with simultaneous and equal movement toward and from each other, and means for moving the members of each set relatively so as to open the same to receive a whole peach therebetween such that the suture plane of the whole peach lies in a plane disposed equidistantly from said members and whereby the gripping members of both sets grip spaced apart curved surfaces of the whole peach on opposite sides of said suture plane and equidistantly spaced therefrom whereby firmly to hold the whole peach for a halving operation, means for halving a whole fruit substantially through its suture plane, and means automatically operable upon the completion of the halving operation for shifting the sets angularly so that each set of members grippingly shifts a half fruit.

27. A fruit holder comprising a support, opposed spaced apart sets of fruit gripping means mounted on said support, means for continuously moving said support along a path of travel, each means including a plurality of fruit gripping members for gripping the curved surfaces of a whole fruit on opposite sides of a plane passing through the stem axis of the whole fruit whereby said fruit may be severed along said plane passing through the stem axis and whereby each half fruit will thereafter be held independently of the other half fruit by one of the sets of fruit gripping members, and means interconnecting said gripping members for thereafter shifting said sets of fruit gripping members relatively to and bodily with said support to move the severed sections angularly from a position such that the cut faces confront one another to a position wherein the cut faces are disposed relatively remotely one from the other.

28. In combination with a travelling carrier supporting a plate, means for continuously moving said carrier, said plate mounting a pair of pivots, an actuatable rack mounted on said plate, fruit gripping mechanism pivotally mounted on said plate and including a toothed member operatively engaged with said rack, said gripping mechanism including a plurality of interconnected, spaced apart fruit gripping members for engaging and gripping therebetween the curved surfaces of a fruit section, said fruit gripping member gripping the fruit arcuately in a common plane substantially adjacent the suture plane of the half fruit, means for automatically actuating said rack for shifting a portion of the fruit gripping mechanism to shift the fruit members substantially ninety degrees, and means thereafter cooperating with the fruit members and the movable plate for actuating the fruit members in said shifted position of the fruit gripping members to release the half fruits and for thereafter reversely shifting said plate and said members to original position, said operation taking place during the continuous movement of the carrier.

29. In combination with a continuously moving carrier, support means formed on the carrier including a pair of spaced toothed members and a pair of upstanding toothed sectors, one each connected to a toothed member, a pair of fruit gripping carriages, each carriage including a depending pinion and a cooperative pivot associated with said gears whereby said toothed sector is meshed with said toothed member and pivots about said pivotal point, means operated by said carrier for simultaneously shifting said toothed members to shift said sectors whereby to cause said fruit gripping carriages to move angularly about said pivot means into juxtaposed confronting position, each carriage mounting a set of fruit gripping means whereby in said juxtaposed position each set of fruit gripping means engages and grips the curved periphery of a whole fruit on opposite side of and in equispaced relation to a plane passing through the seed axis of the whole fruit so gripped, fruit severing means between said sets of fruit gripping members to sever the whole fruit into substantially equal halves with their cut surfaces confronting, and means automatically operative by movement of said carrier and after severance of said fruit for shifting said fruit gripping carriages oppositely outwardly substantially about their pivots whereby grippingly to convey each fruit section and shift the cut surfaces of the half fruits into a spaced relation disposed substantially from the plane of severance.

30. In combination with a continuously moving rotatable carrier support means formed on the carrier including rack means and toothed sectors meshing with said rack means, a pair of fruit gripper mounting supports, each support including a depending toothed sector and a cooperative pivot associated with each of said sectors whereby each said toothed sector is meshed with said rack means and pivots about the axis of a sector, means operated by said carrier for shifting said rack means to shift simultaneously said sectors to cause said fruit gripper mounting supports to move angularly about their pivot means into juxtaposed confronting position, each support mounting a set of fruit gripping means whereby in said juxtaposed position each set of fruit gripping means engages and grips the curved periphery of a whole fruit on opposite sides and in equispaced relation to a plane passing through the seed axis of the whole fruit so gripped, fruit severing means operable between said sets of fruit gripping members to sever the whole fruit into substantially equal spaced sections with their cut surfaces confronting, and means automatically operative on movement of said carrier for thereafter shifting said fruit gripper mounting supports oppositely outwardly substantially ninety degrees about said pivot whereby grippingly to convey each fruit section and shift the cut surfaces of the half fruits into a common plane disposed substantially ninety degrees from the plane of severance, and means associated with said travelling carrier and overlying the portion of travel of the travelling carrier in which the fruit sections are disposed in a common plane for approaching and moving with said travelling cut surfaces of the fruit sections so held and pitting the same.

31. In combination with a continuously moving rotatable drum, means for rotating said drum, means formed on the periphery of the drum including a pair of spaced racks, toothed sectors on opposite sides of each rack, a pair of fruit gripper supports, each such support including a toothed sector and a cooperative pivot associated with each sector whereby said toothed sector is meshed with a rack and pivots about the pivotal axis of said sector, means operated by said drum for simultaneously shifting said racks to shift said sectors to cause said fruit gripper supports to move angularly about said pivot means into juxtaposed confronting position, each such support carrying a set of fruit gripping means whereby in said juxtaposed position each set of fruit gripping means engages and grips the curved periphery of a whole fruit on opposite sides and in equispaced relation to a plane passing through the seed axis of the whole fruit so gripped, fruit severing means operable between said sets of fruit gripping members to sever the whole fruit into substantially equal spaced sections with their cut surfaces confronting, and means automatically operative during movement of said drum for thereafter shifting said fruit gripping carriage oppositely outwardly substantially ninety degrees about said pivot grippingly to convey each fruit section and shift the cut surfaces of the half fruits into a common plane disposed substantially ninety degrees from the plane of severance, means actuated by said drum for actuating the fruit gripping members of each set and pitting means movable with said cut surfaces of the fruit halves so held on said continuously rotating drum for pitting said half fruits.

32. In combination with a stationary support, an endless carrier mounted on said support for movement in an endless path, means for continuously moving said carrier in an endless path, spaced sets of fruit gripping means mounted on said carrier comprising two sets of fruit gripping means, the gripping means of one set being spaced apart on opposite sides of a plane parallel to and passing through the suture plane of a whole peach disposed between said gripping means whereby said whole peach is gripped by both said means adjacent but on opposite sides of the plane passing through the suture plane, means associated with said continuously moving fruit carrier for cutting through the peach and its pit on said plane located between said gripping means for severing the whole peach into two half sections whereby each half section will be held firmly by the gripping means of one set as said gripping means moves with said travelling carrier, and pitting means comprising an oscillatable head associated with said travelling carrier, operating means driven in synchronism with the continuous movement of said carrier for oscillating said head whereby to cause said head to travel with said carrier and at the same speed during a portion of the movement of said carrier, pitting means mounted on and movable relatively to said head, means associated with said gripping means after severance of the whole peach to move the cut faces of the fruit halves into open spaced position with respect to each other, and means operatively synchronized with the movement of the held half sections as they approach the pitting means for causing said pitting means to move with and come into contact with the cut faces of the held half fruit sections and to pit the same as said sections travel with the pitting means.

33. In combination with a support, a continuously movable carrier mounted thereon, spaced sets of fruit gripping means mounted on the carrier and each set including a plurality of spaced fruit grippers, means interconnecting the grippers of each set and means for actuating said grippers to cause them simultaneously to move toward a common center equal distances to centralize a whole peach relatively to said center and to grip the whole fruit solely about its curved surfaces on opposite sides of and equally spaced from the suture plane of the half fruit, means for severing the whole fruit while so gripped along a plane substantially coinciding with and parallel to the suture plane, said grippers of each set operating each to hold a severed half section with the cut faces of the two half sections confronting whereby each half section is held alone at its curved surfaces adjacent its cut face, the curved portion directly opposite the cut face being free of gripping means, and means for relatively and angularly shifting the peach holding grippers of each set to shift each of the peach sections while held by its own gripping means into spaced relation with the cut faces of the half fruits spaced apart, a plurality of pitting means, means for moving the pitting means along with the fruit sections, and means for actuating said pitting means during such movement to pit each half fruit section.

34. In combination with a support, an endless conveyor movable on said support, means for continuously moving said conveyor, a plurality of sets of peach holding means mounted in spaced relation on said conveyor and each comprising spaced fruit gripping members movable with said conveyor in a continuous manner, means operatively interconnecting said fruit gripping members of each set for relatively shifting said members equal distances simultaneously for opening said fruit gripping members in timed relation to a predetermined angular movement of said conveyor for receiving a whole peach therebetween with its suture plane disposed equidistantly therebetween when in open position, means for causing said fruit gripping members to move equal distances simultaneously to grip the whole fruit therebetween and with the suture plane disposed in parallel relation to a plane passing through the spacing between the gripping members of said sets of peach holding means and with the stem axis of the whole peach disposed in predetermined position with respect to said peach holding means, said continuously moving conveyor and peach holding means thereafter continuously carrying said whole peach along a predetermined path, sawing means associated with the path of travel of said gripped peach for sawing through the held fruit and its pit along a plane parallel to and substantially through the suture plane of the held peach whereby to provide two fruit sections, each section being thereafter held by the members of a set of peach holding means, means associated with the travel of the conveyor for thereafter shifting the member of each of said sets of peach holding means angularly to shift the cut face of each peach section with respect to the former position of said cut faces immediately after severance and with the cut faces of said peach sections substantially spaced apart, a shiftable pitting head associated with said conveyor and disposed in the path of travel of the spaced half fruit sections carried by the peach holding means, pitting means carried by said head and shiftable relatively thereto, means for arcuately moving said pitting head to cause it to move with and at the same speed as the conveyor during a portion of movement of the conveyor, means operable during said portion of movement to cause said pitting means to contact the cut faces of each of the held half peach sections to pit the same, and means associated with said pitting means and said peach holding means comprising a fruit backing member adapted to support the curved undersurface of each half fruit that lies directly opposite the cut face thereof during the pitting operation and to withdraw therefrom after the pitting operation, said last mentioned backing up member being automatically adjustable to shift toward and from the curved surface of the half fruit in accordance with the radius of the half fruit.

WILLIAM A. KINGSBURY.

REFERENCES CITED

The following references are of record in the file of this patent:

UNITED STATES PATENTS

| Number | Name | Date |
|---|---|---|
| 445,753 | Ish | Feb. 3, 1891 |
| 1,445,144 | Kohler | Feb. 13, 1923 |
| 1,512,410 | Eldridge | Oct. 21, 1924 |
| 1,915,447 | Robbins | June 27, 1933 |
| 1,941,347 | Gum | Dec. 26, 1933 |
| 2,313,318 | Brown et al. | Mar. 9, 1943 |
| 2,398,780 | Ewald et al. | Apr. 23, 1946 |
| 2,420,659 | Ewald et al. | May 20, 1947 |
| 2,428,157 | Healy | Sept. 30, 1947 |
| 2,443,863 | Lindley | June 22, 1948 |